United States Patent [19]

Niederer et al.

[11] Patent Number: 5,298,162
[45] Date of Patent: Mar. 29, 1994

[54] MULTI-STAGE FLUID FILTER

[75] Inventors: Kurt W. Niederer, 3021 Mountainbrook Rd., Charlotte, N.C. 28210; Cedric R. Jones, Stafford, England

[73] Assignee: Kurt W. Niederer, Charlotte, N.C.

[21] Appl. No.: 750,520

[22] Filed: Aug. 27, 1991

Related U.S. Application Data

[63] Continuation-in-part of Ser. No. 67,236, Jun. 25, 1987, abandoned, which is a continuation-in-part of Ser. No. 856,964, Apr. 29, 1986, Pat. No. 4,681,604.

[51] Int. Cl.$^5$ .............................................. B01D 35/12
[52] U.S. Cl. .................................. 210/418; 210/420; 210/422; 210/424
[58] Field of Search ............... 210/418, 420, 421, 422, 210/423, 424; 137/422, 424

[56] References Cited

U.S. PATENT DOCUMENTS

| 1,950,983 | 3/1934 | Hennebohle | 210/168 |
|---|---|---|---|
| 3,157,131 | 11/1964 | Brydon | 103/220 |
| 3,789,992 | 2/1974 | Treplin et al. | 210/421 |
| 3,828,930 | 8/1974 | Einer et al. | 210/421 |
| 4,311,591 | 1/1982 | Einer et al. | 210/421 |
| 4,565,631 | 1/1986 | Bitzer et al. | 210/422 |
| 4,880,608 | 11/1989 | Stelman | 423/244 |

FOREIGN PATENT DOCUMENTS

| 01564 | 5/1993 | PCT Int'l Appl. |
| 2008969A | 11/1978 | United Kingdom |

Primary Examiner—Robert A. Dawson
Assistant Examiner—W. L. Walker
Attorney, Agent, or Firm—W. Thad Adams, III

[57] ABSTRACT

A multi-stage fluid filter filters entrained particulate matter from a moving fluid stream at substantially constant fluid pressure and filtration efficiency during continuous on-line operation. The filter includes a housing having a fluid inlet and a fluid outlet, first and second stationary filtration elements positioned in the housing, each having a filtration medium therein from an upstream side to a downstream side thereof. The two elements are positioned in series for fluid flow from the downstream side of one of the two elements defined as a first filter stage for accumulating particulate matter on the filtration medium thereof to the upstream side of the other of the two elements defined as a second filter stage having a previously accumulated layer of particulate matter on the filtration medium thereof. A structure is provided for selectably alternating the first and second filter elements to the first and second stage positions to, after cleaning particulate matter from the filter medium in the cleaning stage and, upon an increase in resistance to fluid flow through the second filter stage caused by an increase in thickness and/or density in the layer of particulate matter, redefine the one of the filter elements as the first filter stage, and the other of the filter elements as the second filter stage successively to permit the filter to operate continuously after a filter layer is accumulated on the filter medium in the first filter stage.

16 Claims, 20 Drawing Sheets

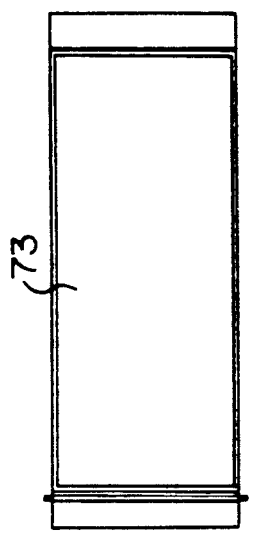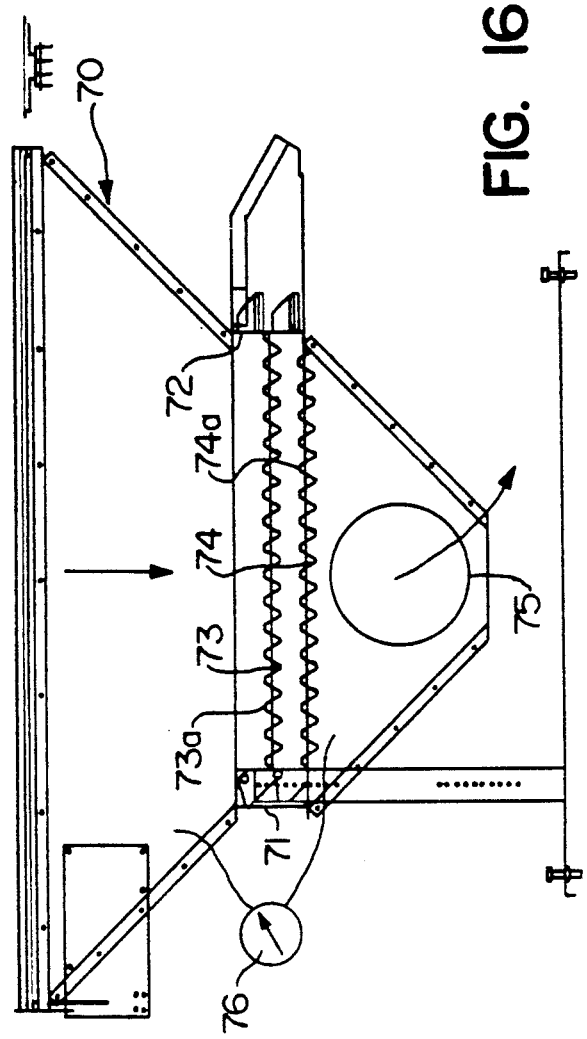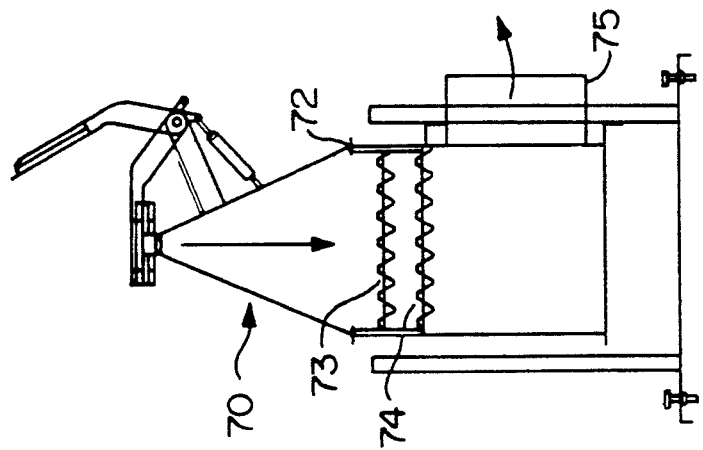

MULTI-STAGE FLUID FILTER

TECHNICAL FIELD AND BACKGROUND OF THE INVENTION

This application is a continuation-in-part application of U.S. Ser. No. 067,236, filed Jun. 25, 1987, now abandoned, which is a continuation-in-part of U.S. Ser. No. 856,964, filed 4/29/86, which is now U.S. Pat. No. 4,681,604.

This invention relates to a multi-stage fluid filter for filter entrained particulate matter from a moving fluid stream. In particular, the application discloses a multi-stage fluid filter wherein enhanced filtration efficiency is achieved by sequentially redefining filtration zones as entrained particulate matter accumulates on filter media in certain of the filtration chambers. The fluid filter is characterized by having relatively few moving parts and by the ability to be very substantially increased in size and capacity without adversely affecting the filtration efficiency of the filter.

Prior art patents disclose the concept of forming a filter medium of enhanced filtration capacity by using a bare filter surface and accumulating on the upstream side of the filter surface a layer of the particulate matter being filtered. It has been learned that such accumulated particulate matter forms a particularly efficient filter of that particular substance. However, the difficulty with such structures is that as the layer of particulate matter accumulates on the filter surface, the resistance to passage of fluid through the accumulating filter media increases as the filtration efficiency increases. At some point, the energy required to force the fluid through the accumulated layer of particulate matter is so great as to render the filter uneconomical both from a capacity and energy consumption standpoint. Prior art patents relating to the above concept utilize an endless drum having a filter screen thereon through which fluid is passed. Particulate matter in the fluid accumulates on the upstream side of the drum. The interior and/or exterior of the drum is defined into a prefilter zone in which the filter layer is accumulated to its optimum thickness. Air passing downstream of the filter layer in this zone is recirculated back through the filter to prevent the introduction of less than optimally filtered fluid into the environment. Once the filter layer has reached its optimum thickness, it is passed into a second zone where fluid is passed through the layer of particulate matter for its primary filtration step. Fluid downstream in this zone is exited into the environment. A third doffing zone strips the accumulated particulate matter from the surface of the drum whereupon the bare drum surface moves back into the first filter zone. Such filters represent a large improvement over earlier filters which caused substantial variations in filtration efficiency and energy consumption because of the necessity to periodically strip the layer of particulate matter from the filtration surface. However, the rotating drum-type of filter must be very carefully sealed on its ends and at the line of separation between the various zones. Perfect sealing under such circumstances is difficult since the drum is rotating and a seal must be created against the underside of the rotating drum which is a porous surface.

SUMMARY OF THE INVENTION

Therefore, it is an object of the invention to provide a multi-stage fluid filter for filtering entrained particulate matter from a moving fluid stream at substantially constant fluid pressure and filtration efficiency during continuous on-line operation.

It is another object of the invention to provide a multi-stage fluid filter which reduces the number of moving parts which must cooperate with the filtration medium.

It is another object of the present invention to provide a multi-stage fluid filter wherein particulate matter is collected on the upstream side of a stationary filter medium and wherein the filtration zones of the filter change in sequence depending on the extent of particulate matter accumulation on the filter medium in any given filtration zone.

It is yet a further object of the present invention to provide a method of filtering particulate matter from a moving fluid stream in a multi-stage fluid filter.

These and other objects of the present invention are achieved in the preferred embodiments disclosed below by providing a multi-stage fluid filter for filtering entrained particulate matter from a moving fluid stream. The filter includes first and second filtration chambers, each filtration chamber having a filtration medium positioned therein from an upstream side to a downstream side thereof. Conduit means are provided for interconnecting the first and second filtration chambers in series for fluid flow from the downstream side of one of the two chambers defined as a first filter stage to the upstream side of the other of the two chambers defined as a second filter stage for two stage filtration of the moving fluid. Fluid is diverted downstream past one of the first or second filtration chambers to define a cleaning stage within the filtration chamber past which fluid flow is diverted.

Cleaning means are provided for cleaning particulate matter from the filter medium in the cleaning stage while fluid flow therethrough is diverted. Sequencing means are provided for selectively operating the diverting means to, after cleaning particulate matter from the filter medium in the cleaning stage and, upon an increase in resistance to fluid flow through the first filter stage caused an increase in thickness and/or density in the layer of particulate matter, redefine the cleaning stage as the first filter stage and the first filter stage as the cleaning stage, successively.

The clean filter medium in the first filter stage accumulates particulate matter thereon and the particulate matter in the first filter stage forms a filter of enhanced filtration capacity in the second filter stage. After sufficient particulate matter in the first filter chamber has collected for efficient filtration, the fluid is diverted to bypass the second filtration chamber at which time the second filtration chamber is cleaned. By redefining each filtration chamber alternately as first and second filter stages, the filter can operate continuously after a filter layer is accumulated on the filter medium in the first and second filtration chambers.

In accordance with another embodiment of the invention, a housing having a fluid inlet and a fluid outlet is provided.

In accordance with another embodiment of the invention, a housing having a fluid inlet and a fluid outlet is provided. First, second and third filtration chambers are positioned in the housing. Each of the filtration chambers has a filtration medium thereon from an upstream side to a downstream side thereof.

First conduit means are provided for selectably interconnecting any two chambers of the first, second and third filtration chambers in series for fluid flow from the downstream side of one of the two chambers defined as a first filter stage to the upstream side of the other of the two chambers defined as a second filter stage.

Second conduit means are provided for selectable interconnecting the fluid inlet in the housing with the upstream side of the filtration chamber defined as the first filter stage, the fluid outlet in the housing with the downstream side of the filtration chamber defined as the second filter stage and for interrupting fluid flow into and out of the third one of the first, second and third filtration chambers to define a cleaning stage.

Cleaning means are provided for cleaning particulate matter from the filter medium in the cleaning stage while fluid flow therewith is interrupted. Sequencing means are provided for selectably operating the first and second conduit means to redefine the cleaning stage as the first filter stage, the first filter stage as the second filter stage and the second filter stage as the cleaning stage, successively. The clean filter medium in the first filter stage accumulates particulate matter thereon. The particulate matter in the first filter stage forms a filter of enhanced filtration capacity in the second filter stage. By redefining each filter chamber as first and second filter stages and a cleaning stage, successively, the filter can operate continuously after a filter layer is accumulated on the filter medium in any one of the first, second or third filtration chambers.

According to yet another embodiment of the invention, a multi-stage fluid filter filters entrained particulate matter from a moving fluid stream at substantially constant fluid pressure and filtration efficiency during continuous on-line operation. The filter comprises a housing having a fluid inlet and a fluid outlet. First and second stationary filtration elements are positioned in the housing, each having a filtration medium trap particulate matter thereon.

The two elements are positioned in series for fluid flow from the downstream side of one of the two elements defined as a first filter stage for accumulating particulate matter on the filtration medium thereof to the upstream side of the other of the two elements defined as a second filter stage having a previously accumulated layer of particulate matter on the filtration medium thereof.

Means are provided for selectably alternating the first and second filter elements to the first and second stage positions to, after cleaning particulate matter from the filter medium in the cleaning stage and, upon an increase in resistance to fluid flow through the second filter stage caused by an increase in thickness and/or density in the layer of particulate matter, redefine the one of the filter elements as the first filter stage, and the other of the filter elements as the second filter stage successively to permit the filter to operate continuously after a filter layer is accumulated on the filter medium in the first filter stage.

According to yet another embodiment there is provided a multi-stage fluid filter for filtering entrained particulate matter from a moving fluid stream, in which filter particulate matter may undergo primary and secondary filtration stages, the secondary filtration stage being through a filter medium which comprises a layer of accumulated particulate matter, the first filtration stage being through a filter medium on which a layer of particulate matter is accumulating, for use subsequently in a said second filtration stage, the filter comprising:

first and second filtration chambers, each filtration chamber having a filtration medium positioned therein from an upstream side to a downstream side thereof;

an inlet into the fluid filter;

an outlet from the fluid filter;

first conduit means leading from said inlet;

second conduit means leading from the first conduit means to the first chamber on the upstream side relative to the filter medium thereof;

third conduit means leading from the first conduit means to the second chamber on the upstream side relative to the filter medium thereof;

a node at which the first, second and third conduit means meet;

valve means associated with the node and having a first control position in which it permits fluid to flow from the first conduit means to the second conduit means, and a second control position in which it permits fluid to flow from the first conduit means to the third conduit means;

and means for directing fluid which has flowed through the first or second chamber in a primary filtration stage, to the second or first chamber for a secondary filtration stage, and then to the outlet.

Suitably the conduit means for directing fluid which has flowed through the first or second chamber in a primary filtration stage, to the second or first chamber for a secondary filtration stage, and then to the outlet, comprises a fourth conduit means which meets the first, second and third conduit means at the node, and through which fluid may be conveyed toward the chamber providing the secondary filtration stage, wherein said first control position of the valve means permits fluid to flow from the first conduit means to the second conduit means and, simultaneously, from the fourth conduit means to the third conduit means, and wherein said second control position of the valve means permits fluid to flow from the first conduit mean to the third conduit means and, simultaneously, from the fourth conduit means to the second conduit means.

According to yet another embodiment there is provided a multi-stage fluid filter for filtering entrained particulate matter from a moving fluid stream, in which filter particulate matter may undergo primary and secondary filtration stages, the secondary filtration stage being through a filter medium which comprises a layer of accumulated particulate matter, the first filtration stage being through a filter medium on which a layer of particulate matter is accumulating, for use subsequently in a said second filtration stage, the filter comprising:

first and second filtration chambers, each filtration chamber having a filtration medium positioned therein from an upstream side to a downstream side thereof;

an inlet into the fluid filter;

an outlet from the fluid filter;

conduit means "one" leading to said outlet;

conduit means "two" leading from the first chamber on the downstream side relative to the filter medium thereof, to the conduit means "one";

conduit means "three" leading from the second chamber on the downstream side relative to the filter medium thereof, to conduit means "one";

a node at which conduit means "one", "two" and "three" meet;

valve means associated with that node and having a first control position which permits fluid to flow from conduit means "three" to conduit means "one", and a second control position in which it permits fluid to flow from conduit means "two" to conduit means "one";

and conduit means for directing fluid which has entered the filter through the inlet selectably through the first or second chamber in a primary filtration stage, then to the second or first chamber in a secondary filtration stage, then to said node at which conduits "one", "two" and "three" meet.

Suitably the conduit means for directing fluid which has entered the filter through the inlet selectably through the first or second chamber in a primary filtration stage, then to the second or first chamber in a secondary filtration stage, then to said node at which conduits "one", "two" and "three" meet, comprises conduit means "four" which meets conduit means "one", "two" and "three" at the node, and through which fluid may be conveyed from the chamber providing the primary filtration stage, wherein said first control position of the valve means permits fluid to flow from conduit means "two" to conduit means "four" and, simultaneously, from conduit means "three" to conduit means "one", and wherein said second control position of the valve means permits fluid to flow from conduit means "two" to conduit means "one" and, simultaneously from conduit means "three" to conduit means "four".

Preferably, both the two previous aspects may be used together, whereby the filter has two nodes, one adjacent the inlet and one adjacent the outlet. Preferably, both nodes are four-branch nodes and said fourth conduit means corresponds to said conduit means "four". Said fourth conduit means thus extends between the nodes to provide the route along which fluid passes, between its primary filtration stage and its secondary filtration stage.

Therefore, according to yet another embodiment there is provided a multi-stage fluid filter for filtering entrained particulate matter from a moving fluid stream, the filter comprising:

first and second filtration chambers, each filtration chamber having a filtration medium positioned therein from an upstream side to a downstream side thereof;

an inlet into the fluid filter;

an outlet from the fluid filter;

first conduit means leading from said inlet;

second conduit means leading from the first conduit means to the first chamber on the upstream side relative to the filter medium thereof;

third conduit means leading from the first conduit means to the second chamber on the upstream side relative to the filter medium thereof;

fourth conduit means;

a first node at which the first, second, third and fourth conduit means meet;

first valve means associated with the first node and having a first control position in which it permits fluid to flow from the first conduit means to the second conduit means, and, simultaneously, from the fourth conduit means to the third conduit means, and a second control position on which it permits fluid to flow from the first conduit means to the third conduit means, and, simultaneously, from the fourth conduit means to the second conduit means;

fifth conduit means (corresponding to conduit means "one" in the previous embodiment) leading to said outlet;

sixth conduit means (corresponding to conduit means "two" in the previous embodiment) leading from the first chamber on the downstream side relative to the filter medium thereof, to the fifth conduit means;

seventh conduit means (corresponding to conduit means "three" in the previous embodiment) leading from the second chamber on the downstream side relative to the filter medium thereof, to the fifth conduit means;

a second node at which the fourth, fifth, sixth and seventh conduit means meet;

and second valve means associated with the second node and having a first control position which permits fluid to flow from the sixth conduit means to the fourth conduit means, and, simultaneously, from the seventh conduit means to the fifth conduit means, and a second control position in which it permits fluid to flow from the sixth conduit means to the fifth conduit means, and, simultaneously, from the seventh conduit means to the fourth conduit means.

Thus, when both valve means are in their first control positions, fluid to be filtered passes from the first conduit means into the second conduit means, through the first chamber and into the sixth conduit means. At the second node it is diverted by the second valve means into the fourth conduit means. It then passes back to the first node, where the first valve means diverts it into the second conduit means. It thus enters the second chamber where it undergoes the second filtration step and leaves the second chamber along the seventh conduit means. At the second node the second valve means diverts it into the fifth conduit means, leading to the outlet.

When both valve means are in their second control positions, the converse of the previous paragraph applies, fluid undergoing its first filter stage in the second chamber, then being conveyed to the first chamber, for the second filter stage.

In certain embodiments the two valve means may be so arranged that they must both be in their first control positions, or both be in their second control positions. This may be achieved by mechanical or electro-mechanical interlinking means. In such embodiments two stage filtration always occurs, and cleaning is effected whilst the filter is not operational.

In other embodiments it is desirable to effect cleaning of one chamber during operation, the other chamber being the sole filtering chamber during the cleaning phase. The first chamber is taken out of filtering operation when the first valve means is in its second control position and when the second valve means is in its first control position. Conversely, the second chamber is taken out of filtering operation when the second valve means is in its first control position and when the first valve means is in its second control position.

The aspects of the present invention presently being described, employing one or more nodes, and one or more valves associated therewith, may be applied to systems, as described above, having three or more chambers, with provision for any one chamber being cleaned whilst the others provide continuous two-stage filtration. However it may also be applied, with particular benefit, to "tandem" systems in which two-stage filtration is the normal operative condition, and cleaning is carried out either by filter shut-down or by taking one chamber out of filtration operation, whereby one-stage filtration takes place whilst that chamber is being cleaned.

Preferably a filter medium comprises a rigid filter body, for example a stainless steel mesh, so that it can support a relatively thick matt of particulate layer, if necessary. Thus, the filter medium preferably does not comprise a flexible paper, card or textile filter body.

Suitably, a valve means associated with a node is a butterfly valve, having a valve plate movable about a medial axis. The first and second control positions of a said butterfly valve are suitably the respective diagonal positions of the valve plate, across the respective node.

Desirably, in all applications other than low stringency applications, a said valve means provides an effective seal, without fluid leakage across the valve, whereby only the fluid flow modes defined above are permitted. Sealing may be provided by mechanical contact, for example by means of elastomeric or other polymeric sealing means along the contact regions of the valve member of the valve means, and its seating. However, in particularly harsh environments abrasion, leading to seal deterioration, may take place therebetween. A preferred valve means for use in relation to the present invention may maintain a seal by emission of a gas in the region in which the valve member and its seating are juxtaposed. Such a valve means is not only useful in the context of the embodiments described above, having a node and valve means associated therewith, but is thought to be novel and may be of wider application.

Therefore in accordance with a further invention there is provided a valve means having a valve member and a seating therefor, the valve means having passage means for the emission of a gas in the region in which the valve member and the seating are juxtaposed, whereby a seal may be substantially maintained therebetween.

Whilst the passage means could be such as to emit gas from the seating, for example being provided in housing means which defines the seating, the passage means is preferably such as to emit gas from the valve member.

Preferably, in a valve means in accordance with this aspect, the valve member and its seating do not mechanically contact each other, but have a gap therebetween, and gas is emitted in the region of this gap, to substantially maintain the seal. In other embodiments the valve member and its seating can mechanically contact each other, but only lightly, so that the seal is effectively maintained by both the mechanical contact and by the gas emission. In other embodiments the valve member and its seating can mechanically contact each other so that they alone provide a seal, the valve means having passage means as described above, arranged to become operative, to provide a seal, only when the mechanical seal fails. For example the valve means may be constructed so that the outlet(s) of the passage means are normally blocked by the mechanical seal, so that if the mechanical seal is good gas cannot egress therefrom, but if the mechanical seal fails, gas can egress therefrom, to maintain the seal. In such embodiments, means may be provided for sensing that condition, for example by detection means arranged to detect flow of the gas upstream of, or in, or downstream of, the passage means, whereby repair of the mechanical seal may be effected, when convenient.

The valve means could be one of a number of types. For example it could be a rotary valve, a gate valve, a slide valve or a butterfly valve. Preferably, the valve means is a butterfly valve.

Considering now a filter in accordance with earlier aspects, having one or more nodes and one or more valve means associated therewith, when a valve means is a butterfly valve, as is preferred, a preferred butterfly valve for use in relation to such aspects maintains a seal not by mechanical contact between the edges of the valve means and the node, but by emission of a gas, as described above, preferably from the edges of the valve plate. Such a valve is not only useful in the context of the filter embodiments described above, but is thought to be novel and can be expected to be of wider application.

Therefore, in accordance with a further invention there is provided a butterfly valve having:

a valve plate movable about a medial axis, and having edges past which a fluid whose flow is being controlled by the valve plate is substantially unable to pass, in use, when the valve plate is in an operative position;

means defined within the valve plate for the passage of a gas;

and gas outlet means associated with said edges, said gas outlet means communicating with said means defined within the valve plate for the passage of a gas.

In operation, the gas used is conveniently air, and is fed through the valve plate to the gas outlet means at a sufficient rate to maintain an effective non-mechanical seal. There is a small gap between the edges of the valve plate and the housing therefor. This gap is preferably no more than 4 mm in width, preferably no more than 2 mm. The rate at which the gas needs to be fed to achieve this will depend on the flow conditions of the fluid, the flow of which is being controlled by the valve.

Preferably, the axis of the valve plate, about which axis the valve plate may turn, is provided with conduit means which communicates with said means defined within the valve plate for the passage of a gas. In use, the gas may be fed to the valve plate through such conduit means.

In accordance with a further invention there is provided a method of filtering particulate matter and an undesired gaseous material from a moving fluid stream in a multi-stage fluid filter in which particulate matter may undergo primary and secondary filtration stages, the secondary filtration stage being through a filter medium which comprises a layer of accumulated particulate matter, the first filtration stage being through a filter medium on which a layer of particulate matter is accumulating, for use subsequently in a said second filtration stage, wherein the layer of accumulated particulate matter which is employed in the second filtration stage comprises a particulate reactant material which reacts with the undesired gaseous material.

Thus, in the method of this embodiment the filter may offer a matt or cake of accumulated particulate matter to the fluid stream at all times.

Suitably, the particulate reactant material is fed into the fluid to be filtered such that it accumulates with the accumulating layer of particulate matter in the first filter medium. It may be fed into the fluid continuously, whereby it is distributed evenly throughout the layer which accumulates, or it may be fed into the fluid discontinuously, in one or more batches, so that the layer comprises a stratum or strata preferentially rich in the reactant material.

Preferably a filter medium comprises a rigid filter body, for example a stainless steel mesh, so that it can support a relatively thick matt of particulate layer, if necessary. Thus, the filter medium preferably does not comprise a flexible paper, card or textile filter body. The particulate reactant material may have similar mesh/size characteristics to said particulate matter to be filtered. Thus, the mean diameter of the particulate reactant material may be within 25% of the mean diameter of said particulate matter to be filtered. In alternative embodiments the particulate reactant material may be of considerably smaller mesh/size than said particulate matter to be filtered, so as to locate in interstices therebetween in the layer which accumulates.

The particulate reactant material may react with said gaseous material without producing a different gaseous material. Alternatively it may react with said gaseous material to produce a different gaseous material, which is less undesirable.

One example of the method of this aspect is the incorporation of particulate sodium bicarbonate in a filtration medium of a filter used to filter exhaust from a power station, to reduce sulphur dioxide emission.

Another example of the method of this aspect is the incorporation of particulate activated charcoal in a filtration medium of a filter, to reduce the emission of malodorous vapors.

A said fluid which may be filtered by a filter as described herein is preferably a gas.

It will be appreciated that the method of this aspect may be used in conjunction with any other method or any apparatus described herein. Any such combination constitutes a further aspect of the present invention. Also, the method of this aspect may be used with other multi-stage apparatus or methods, for example prior art apparatus or methods, such as those described in EP-A-0026069 and FR-A-2200040.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIGS. 16-18 illustrate another embodiment of the invention.

DESCRIPTION OF THE PREFERRED EMBODIMENT

Figure 1:
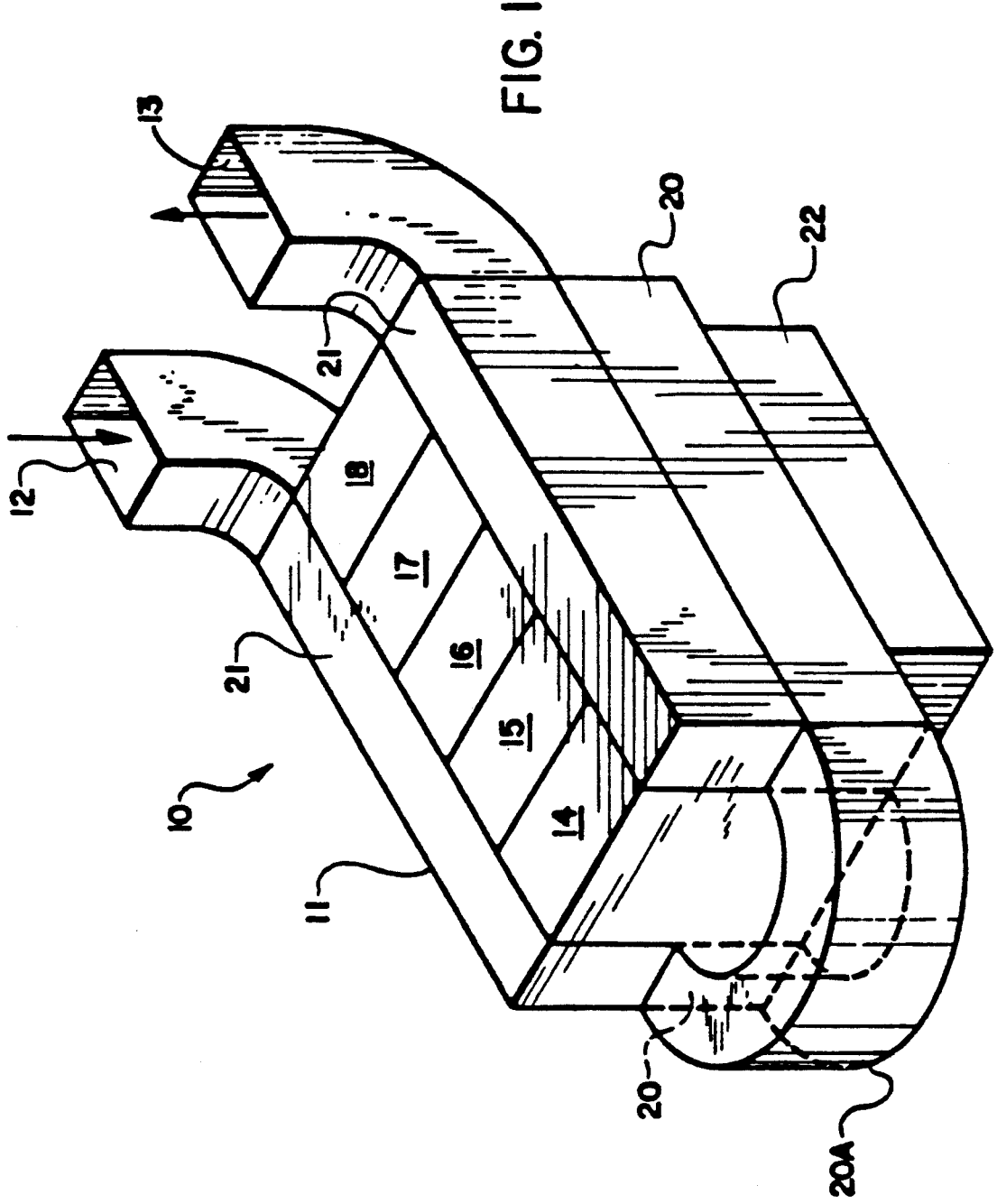
FIG. 1 is a perspective view of a filter according to the present invention.

Referring now specifically to the drawings, a multi-stage fluid filter according to the present invention is illustrated in FIG. 1 and broadly indicated at reference numeral 10. The fluid filter 10 is contained within a housing structure 11 which is provided with a fluid inlet 12 and a fluid outlet 13. Five separate filtration chambers 14-18, inclusive, are positioned within housing 11. First conduit means 20 is positioned within housing 11 as is a second conduit means 21. Sequencing means, comprising the mechanical apparatus such as solenoids and related hardware for operating filter components is contained within a cabinet 22. The first conduit 20 extends along both sides of filter 10 and communicates one side with the other through an arcuate conduit segment 20A. The second conduit 21 likewise is positioned on both sides of filter 10. As can be seen in FIG. 1, one side of the second conduit communicates with inlet 12 and the other side of conduit 21 communicates with outlet 13. Communication between the two sides of conduit 21 takes place through filter chambers 14-18 in the manner described below.

Figure 2:
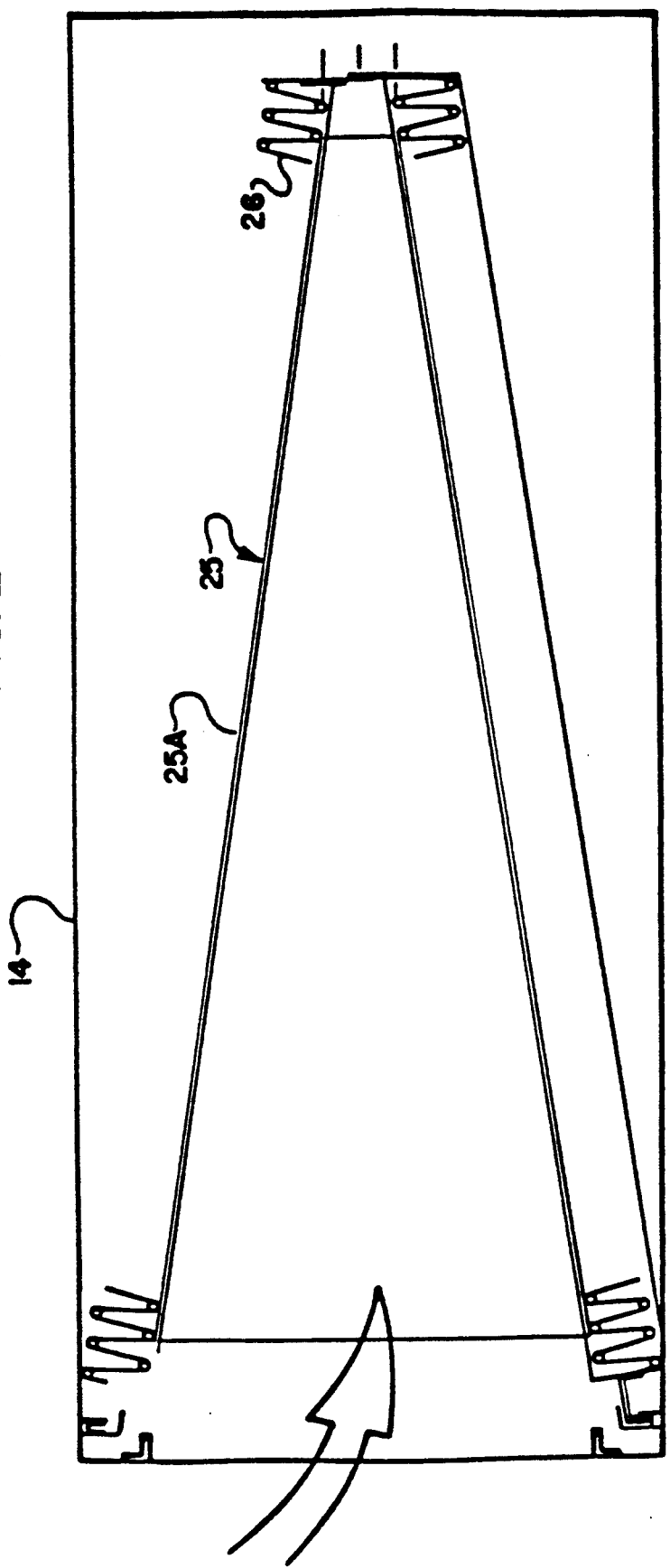
FIG. 2 is a top plan view, with parts broken away of a filtration chamber with the filtration medium positioned therein.

In FIG. 2, a filtration chamber is illustrated in a top plan view. Chambers 14-18 are identical in every respect, therefore, the detail in FIG. 2 relating to filtration chamber 14 suffices to illustrate the structure of all five chambers. As can be seen, filtration chamber 14 comprises a rectangular enclosed box within which is positioned a trapezoidally shaped filtration medium 25 which comprises a metal frame on which is positioned, in accordion fashion, a wire screen 26 on which the filtered particulate matter accumulates. In the embodiment shown in this application, the wire screen 26 is formed of a 60×60 warp/filling mesh. The interior of the filter medium 25 comprises the upstream side through which the particulate laden air enters, as is shown representationally by the arrow. The remainder of filtration chamber 14 outside of the filtration medium 25 comprises the downstream side of the filtration chamber. Therefore, as particulate-laden air passes through the filtration medium 25 from the downstream to the upstream side, particulate matter is accumulated on the inner surface of the wire mesh 26.

Figure 4:
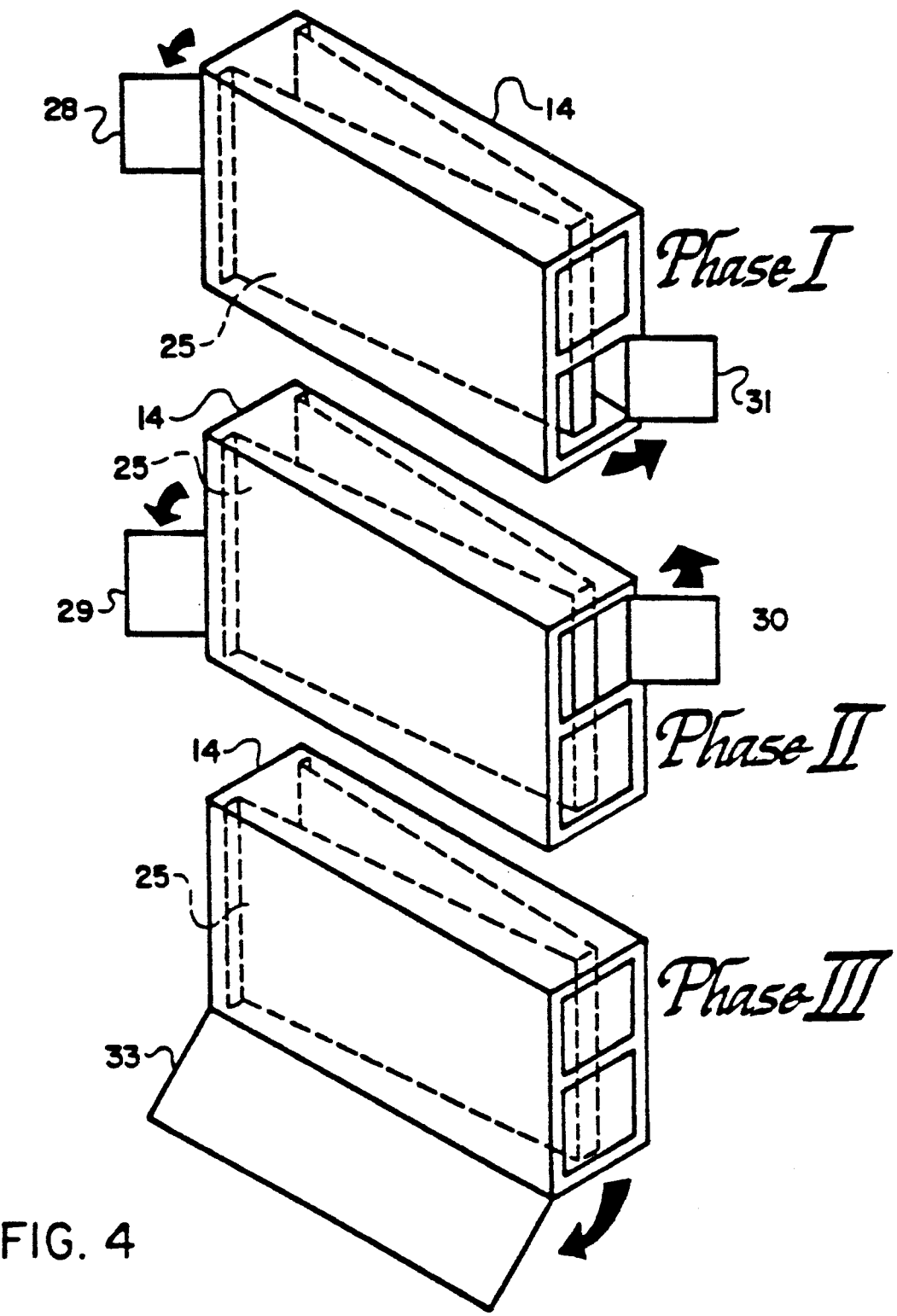
FIG. 4 is a simplified perspective view of a single filtration chamber in three sequential phases of operation.
Figure 5:
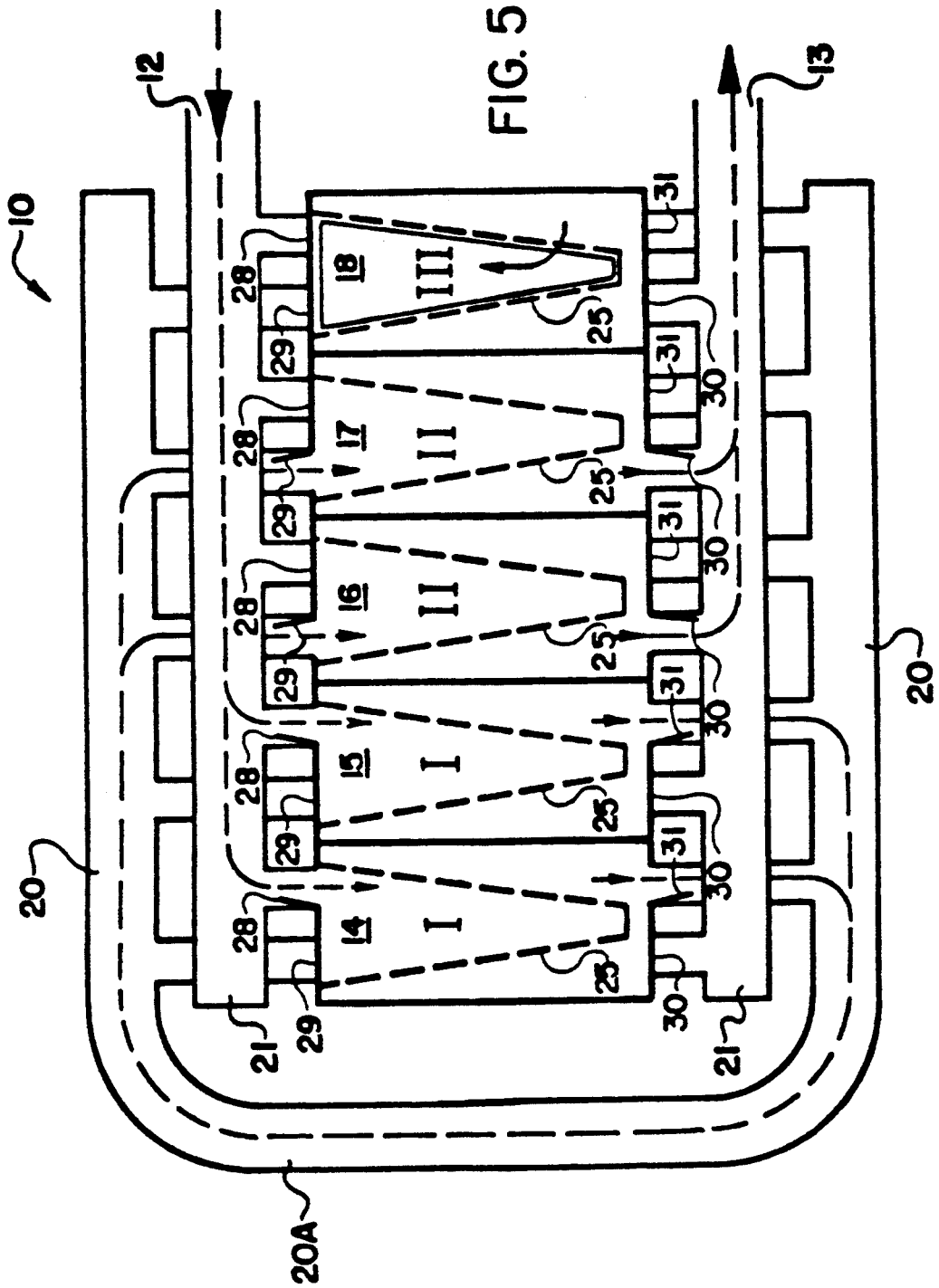
FIG. 5 is a schematic view with parts rearranged for clarity of the filter shown in FIG. 1 and showing the three stages during an initial phase of operation.

Referring now to FIG. 4, the construction of each of the filter chambers 14-18 is further illustrated. Again, since all of the filtration chambers 14-18 are identical, the operation will be described with reference to filtration chamber 14. As can be observed from FIG. 4, each filtration chamber passes through three successive phases. By referring simultaneously to the illustration of phases I and II, it will be noted that filtration chamber 14 has two vertically-spaced doors 28 and 29. On the other end of filtration chamber 14 are two similarly vertically-spaced doors 30 and 31. Note that doors 28 and 29 communicate with filtration chamber 14 through the upstream side and are therefore used to introduce particulate laden air into filtration chamber 14. Filtered air is discharged from filtration chamber 14 through doors 30 and 31.

Referring now to the phase III illustration in FIG. 4, filtration chamber 14 also includes a trap door 33 which encompasses substantially the entire bottom of the filtration chamber. This door is opened during the cleaning stage during which time the entire filtration medium 25 is shaken vigorously with a mechanical shaker to dislodge the accumulated particulate matter on the inner surface of the wire mesh screen 26.

Reference is now made to FIGS. 5-10. The filter 10 has been substantially rearranged in order to illustrate the sequence of operations. Basically, the doors 28, 29 and 30, 31 on each end of each of the filtration zones 14-18 are shown side-by-side rather than on top and bottom as they exist in reality. In addition, the first and second conduits 20 and 21 have been rearranged so that the second conduit 21 is no longer positioned directly above the first conduit 20.

Air to be filtered enters the filter 10 through fluid inlet 12 and into the second conduit 21. Note, as in FIG. 1, that second conduit 21 is in two segments with one segment on each side of the filtration chambers 14-18. The first conduit 20 extends around filter 10 from one side to the other through a curved segment 20A. Filtration chambers 14 and 15 have been identified with a Roman Numeral I corresponding to phase I in FIG. 4. Filtration chambers 16 and 17 have been identified with a Roman Numeral II corresponding with phase II in FIG. 4, and filtration zone 18 has been identified with a Roman Numeral III corresponding with the phase III illustration in FIG. 4.

The purpose of the operation of the filter is to accumulate on the filtration medium 25 in chambers 14 and 15 a matt having an enhanced degree of filtration efficiency. Therefore, by continued reference to FIG. 5, fluid air enters fluid inlet 12 and passes into conduit 21. Doors 28 in filtration chambers 14-18 communicate with conduit 21 immediately downstream of inlet 12. Note in FIG. 5 that doors 28 are closed in filtration chambers 16, 17 and 18. Therefore, all of the unfiltered air enters chambers 14 and 15 through open doors 28 and pass from the upstream to the downstream side of filtration medium 25. As the air passes through filtration medium 25, particulate matter is accumulated on its inner side. As the once filtered air passes through filtration medium 25, it enters the downstream side of filtration chambers 14 and 15 and exits through doors 31. Note that doors 31 enter into conduit 20 and the air is directed through curved segment 20A back around to the upstream side of filtration chambers 14 and 15. Doors 29 which communicate with conduit 20 are closed in chambers 14, 15 and 18 and open in filtration chambers 16 and 17. Therefore, the air which has once been filtered in chambers 14 and 15 now enters the upstream side of chambers 16 and 17 and is filtered once again. In stage II, the filtration achieves a higher efficiency because particulate matter has been allowed to accumulate to a predetermined thickness on the inner walls of filter medium 25, thereby defining a filter medium of enhanced filtration efficiency and capacity. Therefore, the stage II filtration chambers 16 and 17 perform an enhanced filtering operation on the air before it is discharged through open doors 30 into conduit 21 and through fluid outlet 13. During this stage, all of the doors 28, 29, 30 and 31 in filtration chamber 18 are closed. Therefore, phase III comprises a cleaning phase during which door 33 (not shown in FIG. 5 but in FIG. 4) is opened and a mechanical shaker (not shown) physically dislodges the layer of particulate matter contained on the inner surface of filter medium 25.

Figure 6:
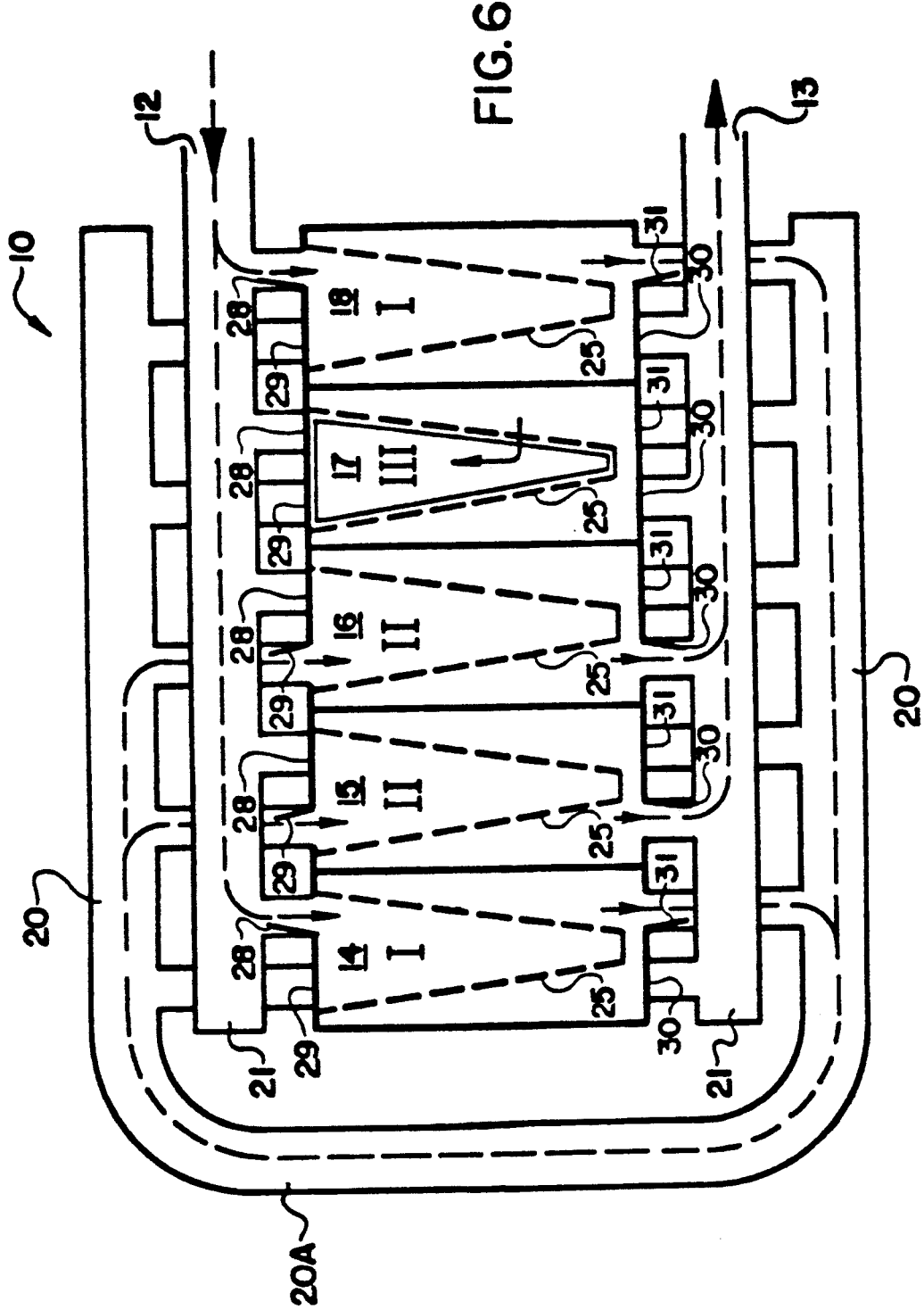
FIGS. 6-10 illustrate the filter shown in FIG. 5 in sequential stages of operation.

At a certain point, the thickness of the layer of particulate matter on the inner surface of filtration medium 25 in filtration chambers 16 and 17 (the phase II filtration step) becomes so thick that increased resistance to the flow of air through the layer of particulate matter is encountered. At the same time, the layer of particulate matter on the inner surface of filtration medium 25 in the first stage filter chambers 14 and 15 is just reaching its level of optimum filtering efficiency. At this point, automatic pressure gauge sensing means contained in the sequencing apparatus cabinet 22 open and close doors 28, 29, 30 and 31 so that the filtration zones are redefined as is shown in FIG. 6. Now, the first filtration zone comprises filtration chambers 14 and 18. This can be observed because doors 28 to these two chambers only are open. Therefore, unfiltered air from fluid inlet 12 into conduit 21 can only enter filtration chambers 14 and 18. Filter medium 25 in filtration chamber 18 is completely bare, having just been shaken and the particulate layer dislodged through door 33. A relatively thin layer of particulate matter is accumulating on the inner surface of the filtration medium 25 in filtration chamber 14. At the same time, the increasing thickness of the layer of particulate matter in filtration chamber 15 means that it can now serve as one of the filtration chambers in the second stage filtration step since the filtration efficiency of the layer of particulate matter is reaching its optimum. Note that doors 29 and 30 in filtration chambers 15 and 16 are open. Therefore, the air which enters filtration chambers 15 and 16 through doors 29 has just passed through filtration chambers 14 and 18 and has therefore been once filtered. The remaining particulate matter is removed in filtration chambers 15 and 16 whereupon the twice filtered fluid exits through doors 30 into conduit 21 and through fluid outlet 13. Chamber 17 now has the greatest accumulation of particulate matter is now defined as the cleaning stage and is cleaned in the manner described above by opening door 33 and shaking the filtration medium 25 to dislodge the layer of particulate matter.

Figure 7:
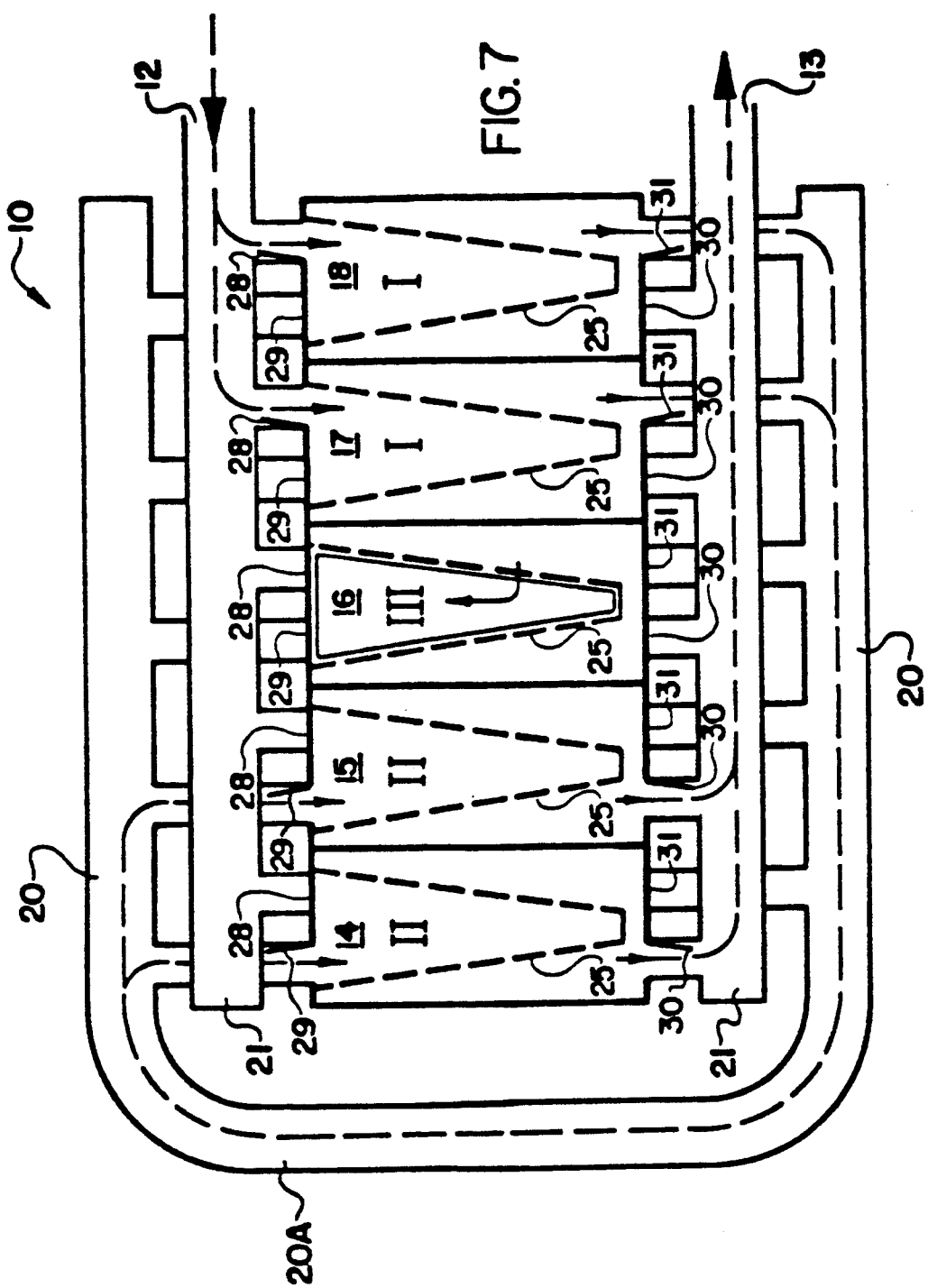

As can be seen in FIG. 7, the first filter stage now comprises filtration chambers 17 and 18. The filter medium in filtration chamber 17 is bare, having just been doffed as illustrated in FIG. 6. The particulate layer in filtration chamber 18 is becoming thicker and is increasing in its filtration efficiency. Chambers 14 and 15 are now defined as the second filter stage, the layer of particulate matter therein having reached its optimum filtration efficiency. At the same time, the layer of particulate matter in filtration chamber 16 has become too thick to efficiently filter and allow the flow of air therethrough. Therefore, it is defined as the cleaning stage and it is cleaned in the manner described above.

Figure 8:
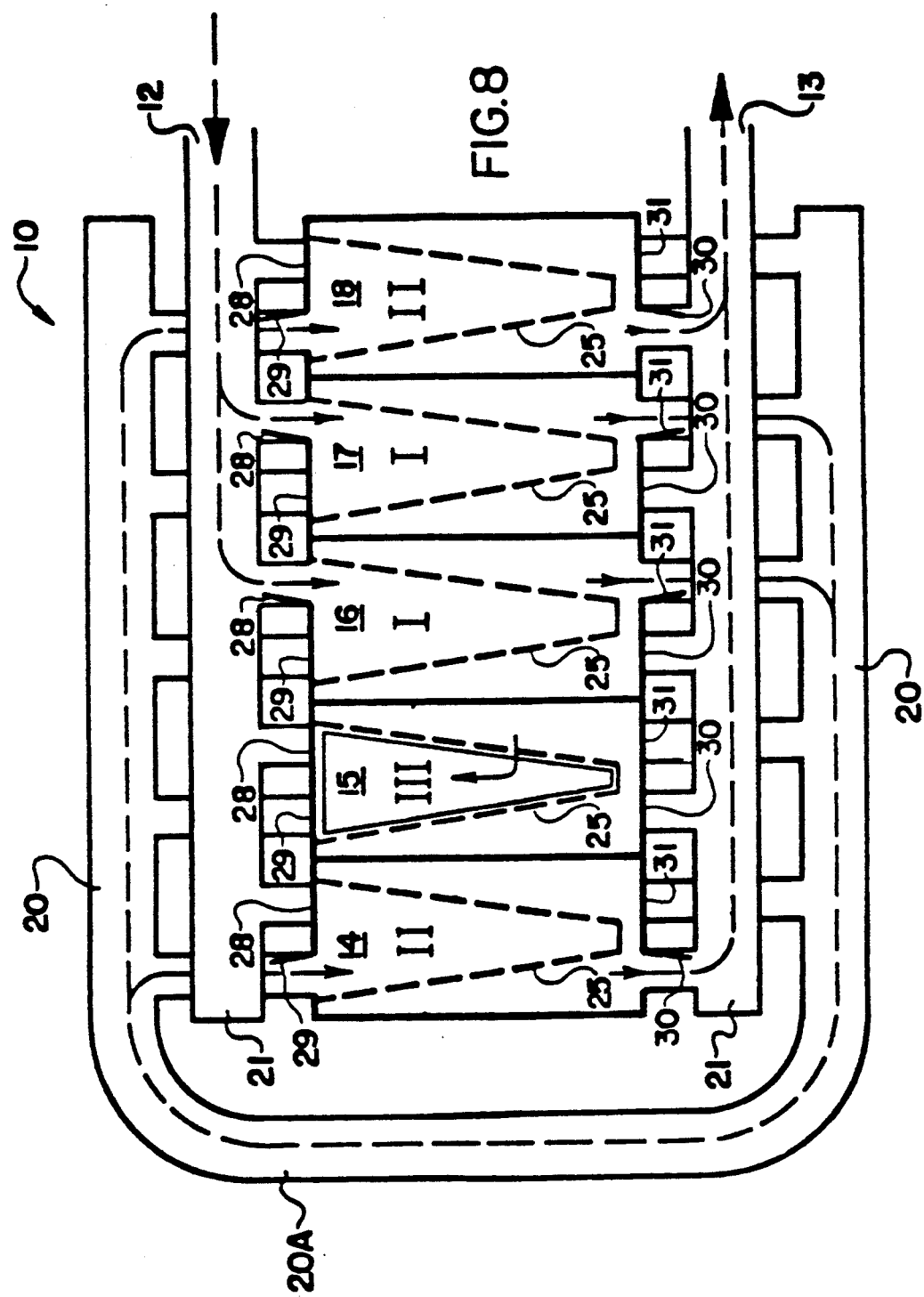

Referring now to FIG. 8, filtration zones 14-18 have once again been redefined. Now, filtration zones 16 and 17 comprise the first filter stage, the filter medium in filtration chamber 16 being bare because of the cleaning stage just completed in FIG. 7. Chambers 14 and 18 comprise the second filter stage and filtration chamber 15 is defined as the cleaning stage. Note once again that the sequencing apparatus 22 has rearranged the pattern of opened and closed doors 28-31 so that the unfiltered air which enters conduit 21 through fluid inlet 12 first passes through filtration chambers 16 and 17 and then through filtration chambers 14 and 18 before exiting into conduit 20 and out through fluid outlet 13.

Figure 9:
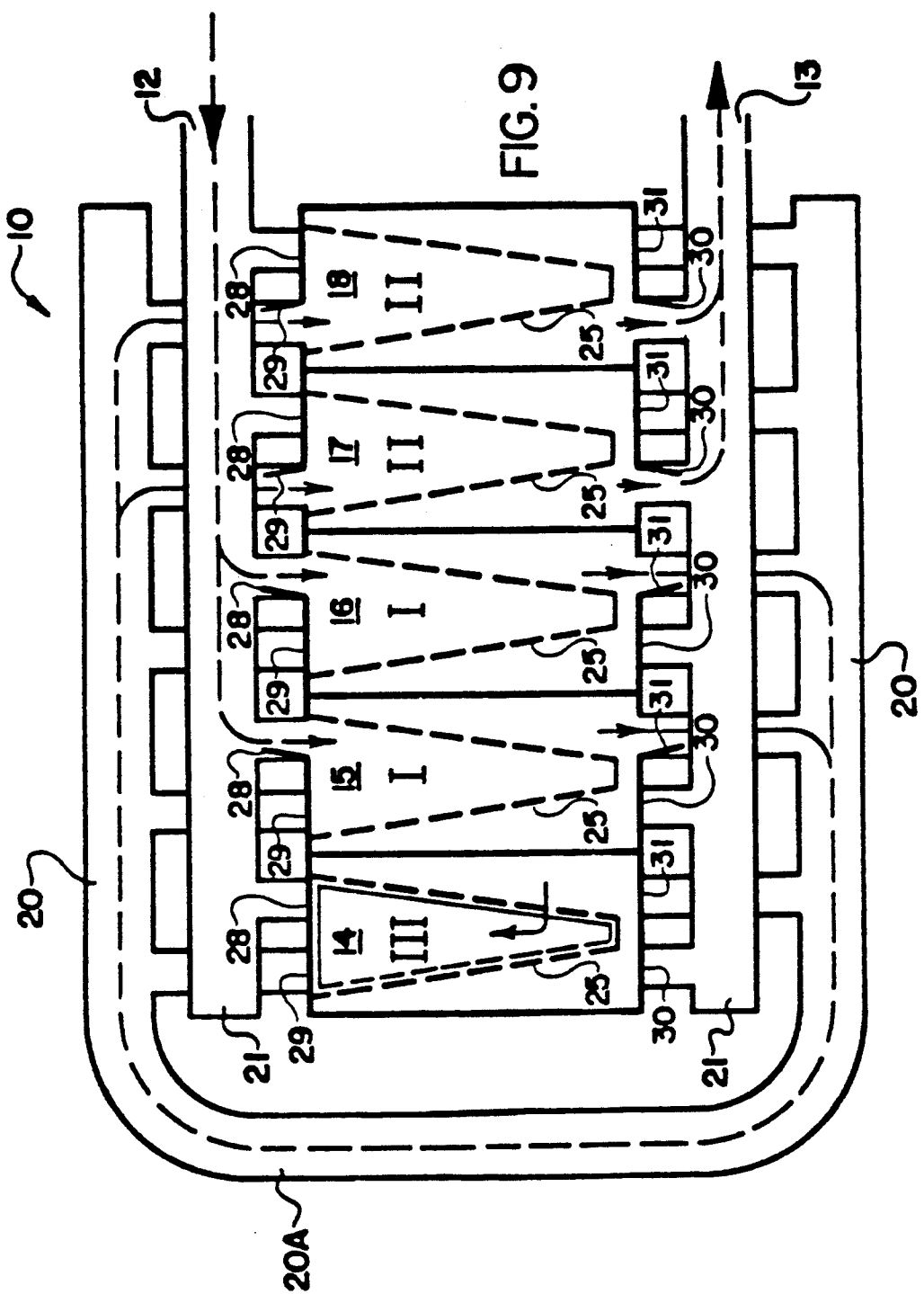

In FIG. 9, filtration chambers 15 and 16 comprise the first filter stage, filtration chambers 17 and 18 comprise the second filter stage and the filtration chamber 14 comprises the cleaning stage. Again, the doors are controlled in such a way as fluid enters first filtration chambers 15 and 16, then filtration chambers 17 and 18 before exiting through fluid outlet 13. During this time, the layer of particulate matter on the filter medium 25 in filtration chamber 14 is being cleaned. When the layer of particulate matter increases beyond optimum thickness in filtration chamber 18, the first and second filtering stages and the cleaning stages are once again redefined, and the arrangement is back to where the operation began in FIG. 5.

Figure 10:
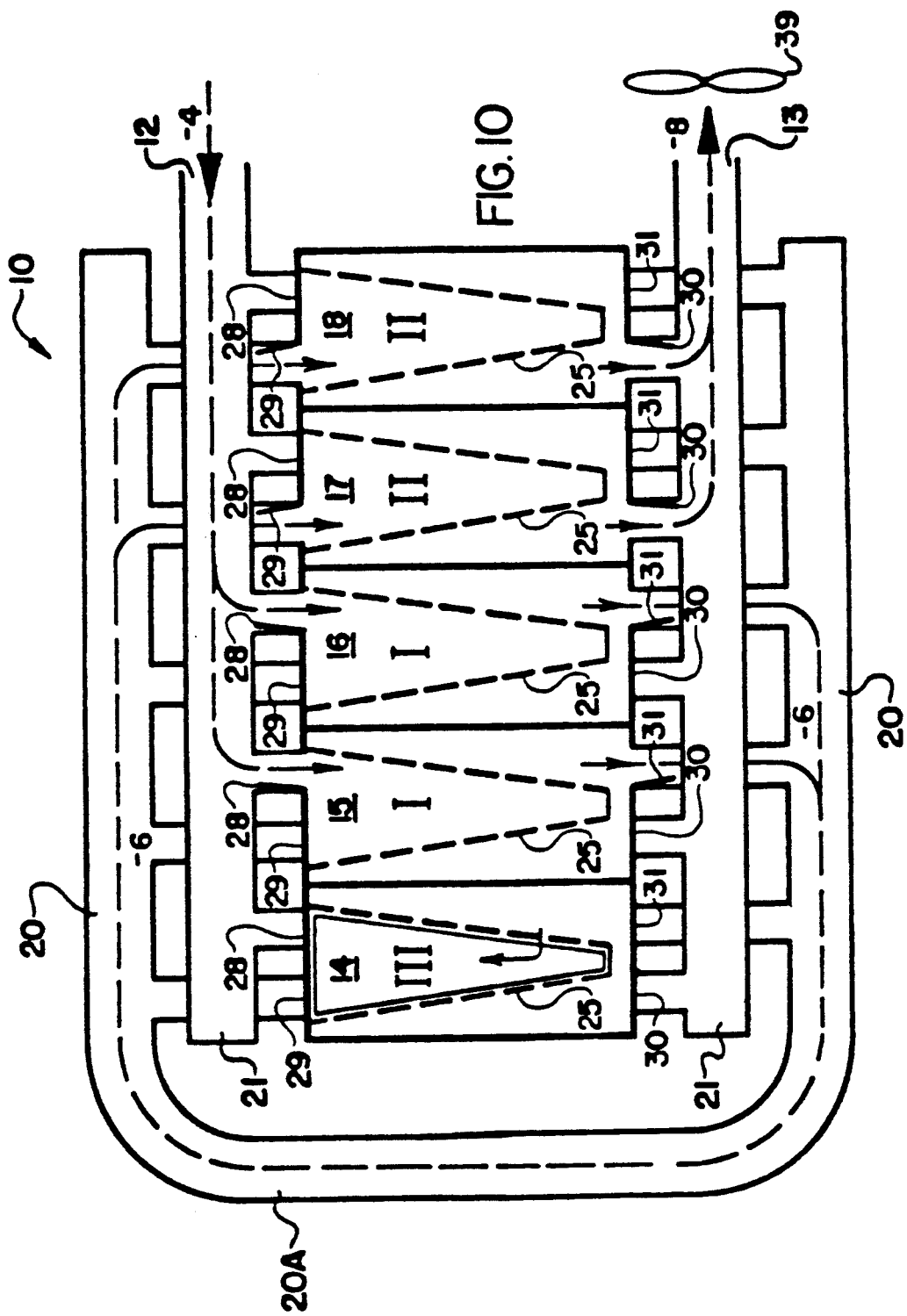

Referring now to FIG. 10, the same embodiment as illustrated in FIGS. 5-9 is shown. Air enters fluid inlet 12 at a pressure of minus 4 inches of water. The suction fan 39 for the filter 10 is positioned downstream of fluid outlet 13. Fan 39 exerts a pressure of minus 8 inches of water. Therefore, the pressure drop from the fluid inlet 12 to the fluid outlet 13 is four inches. The pressure of the air in conduit 20 is minus 6 inches of water. This reflects the fact that air in conduit 20 has been subject to one drag inducing pass through filter chambers 15 and 16, whereas the air upstream of filtration chambers 15 and 16 must make two drag inducing passes.

Figure 11:
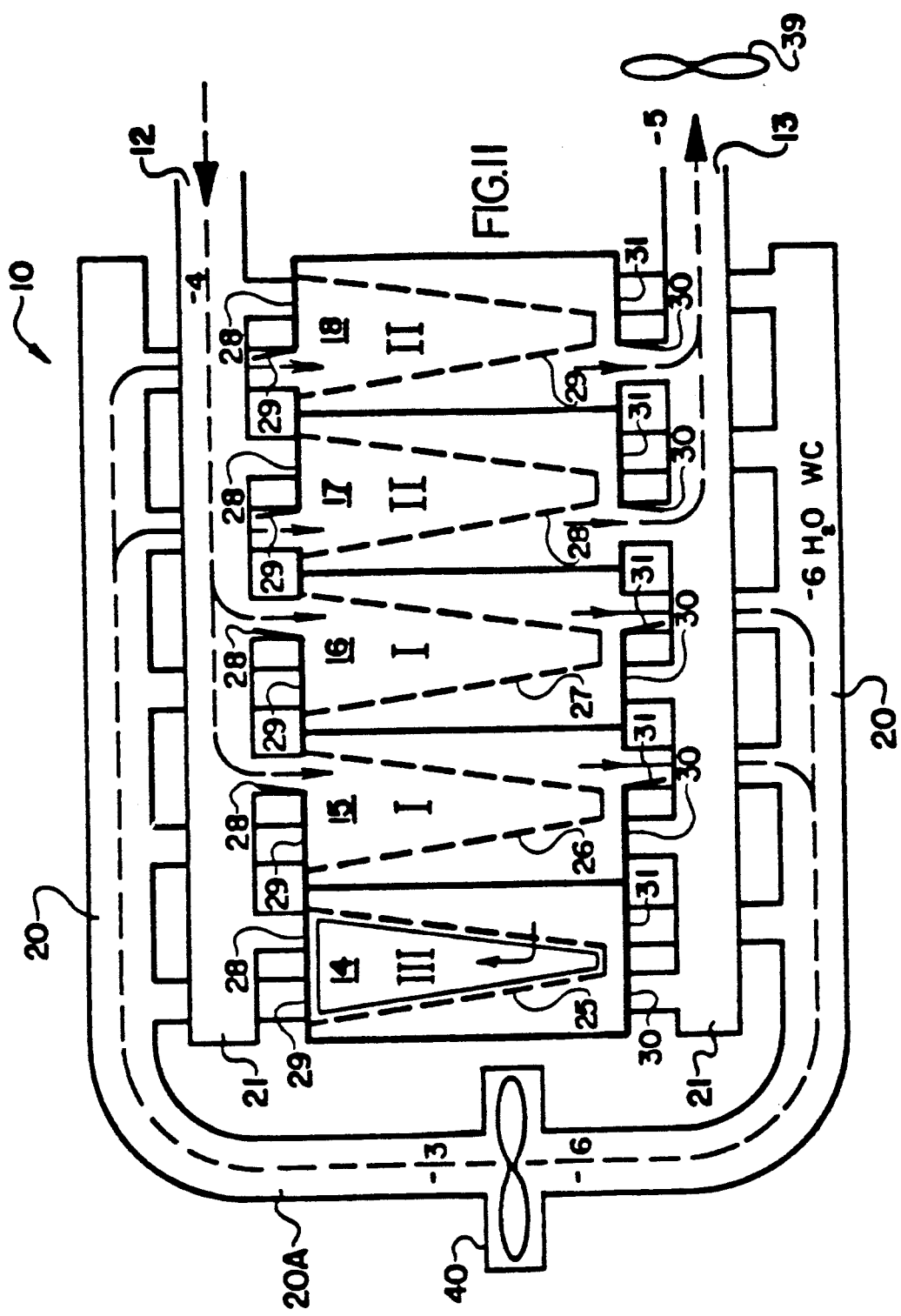
FIG. 11 illustrates a filter similar to that shown in FIG. 5 but with an auxiliary fan, with the filter shown in stage 3, cleaning position.
Figure 12:
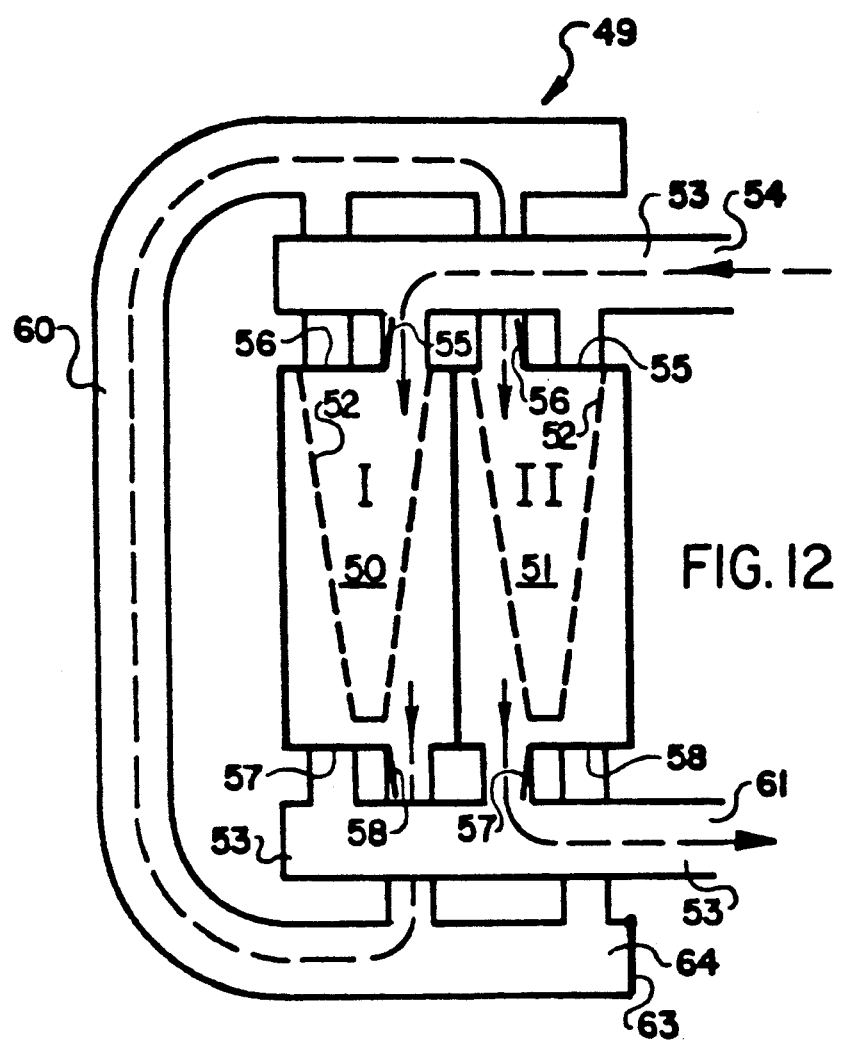
FIGS. 12-15 illustrate another embodiment of the filter in sequential stages of operation.

An alternate arrangement is shown in FIG. 11. Here, not only is there a fan 39 positioned downstream of fluid outlet 13 but also an auxiliary fan 40 positioned in the curved segment 20A of conduit 20. As in FIG. 10, air enters fluid inlet at a pressure of minus 4 inches. Auxiliary fan 40 increases this pressure to minus 6 inches of water on the downstream side of filtration chambers 15 and 16, and to minus 3 inches of water on the upstream side of filtration chambers 17 and 18. Filtered air exits through fluid outlet 13 at minus 5 inches.

To summarize, the clean filter medium in the first filter stage, whichever filter chamber that might be, accumulates particulate matter thereon. The layer of particulate matter in the first filter stage forms a filter of enhanced filtration capacity when redefined as the second filter stage. By redefining each filtration chamber 14-18, successively, as first and second filter stages and a cleaning stage, the filter can operate continuously after a filter layer is accumulated on the filter medium 25 in any of the filtration chambers.

Figure 3:
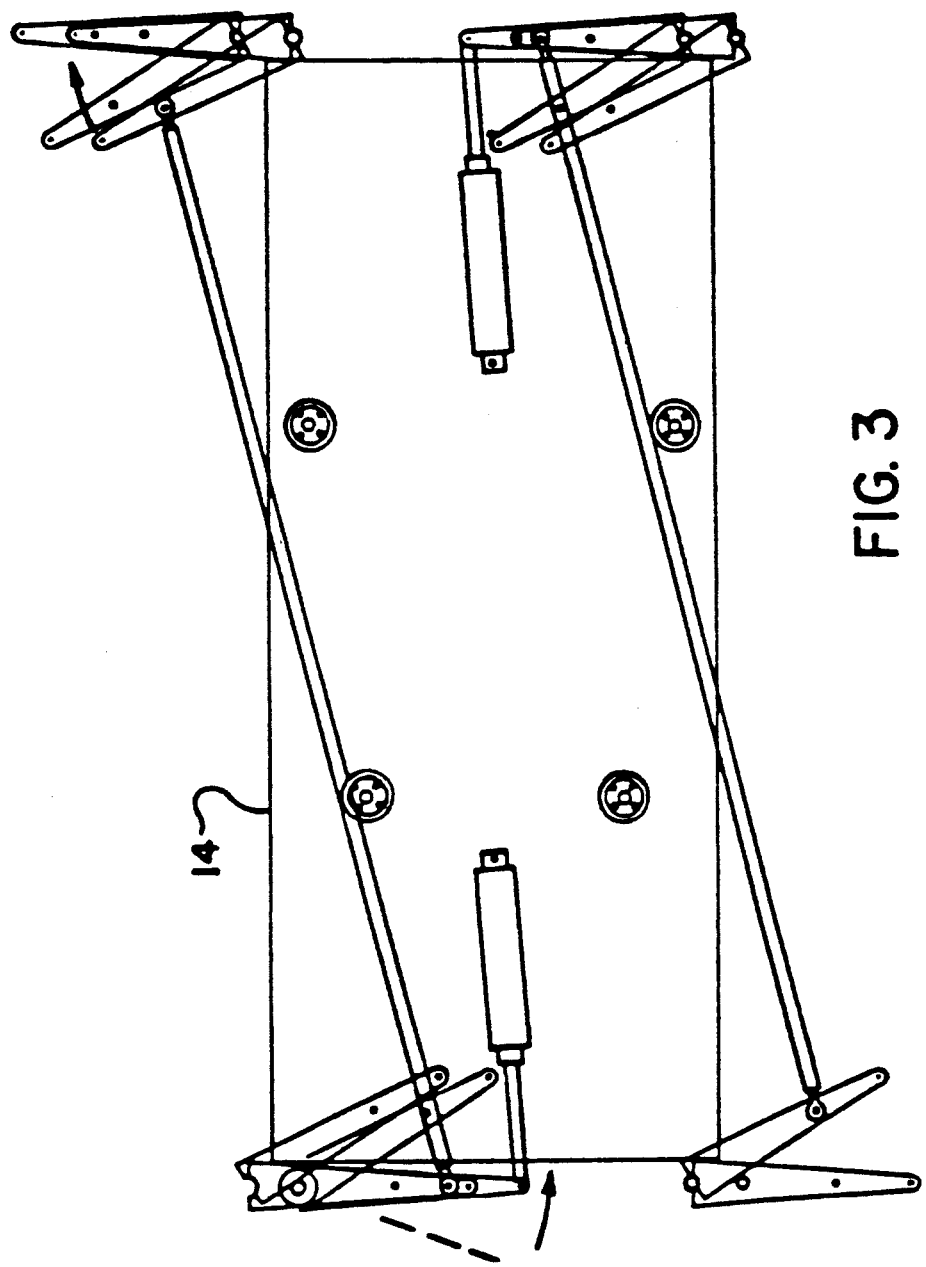
FIG. 3 is a top plan view of a filtration chamber showing the operation of the doors.

In the embodiment described above, a minimum of three filter chambers is required. However, there is no theoretical maximum number of filtration chambers required. The chambers can be ganged together in any suitable arrangement and can be sequenced so that many more than only two filtration stages are defined. In the embodiment disclosed above, air velocity is nominally sixty feet per second. The doors are interconnected to open and close simultaneously as is shown in FIG. 3. The doors can be operated by conventional electric solenoids or pneumatic cylinders in a manner which is completely conventional and therefore requires no further discussion.

Another embodiment of the invention is illustrated in FIGS. 12-15. The construction of the filter is in most respects identical to that described above. In the embodiment shown in FIGS. 12-15, only two filter chambers 50 and 51 are provided. However, as with the embodiment shown in FIGS. 5-11, any number of filter chambers can be used and ganged as desired. Filtration chambers 50 and 51 are provided with a filter medium 52, in a trapezoidal form exactly as described earlier and illustrated in FIGS. 2 and 4. Air to be filtered enters a conduit 53 through an inlet 54. Air enters filtration chambers 50 and 51 through a door 55 in each. The air passes through the filtration medium 52 from the upstream to the downstream side thereof and exits through a door 57 on the downstream side of the filtration chambers 50 and 51. Doors 56 admit once filtered air from a conduit 60 into filtration chambers 52 and discharge once filtered air into conduit 60 through doors 58 in the downstream side of filtration chambers 50 and 51. Air exits through conduit 53 on the downstream side of filtration chambers 50 and 52 through a fluid outlet 61. In the arrangement shown in FIG. 12, filtration chamber 50 is defined as a first filter stage and filtration chamber 51 is defined as a second filter stage. The stages, as previously, are represented by Roman Numerals I and II. Air enters conduit 53 through inlet 54. The air passes into filtration chamber 50 through open door 55 and passes through the filtration medium 52 to the downstream side of filtration chamber 50 and exits through open door 58. Note that no fluid enters directly into filtration chamber 51 from conduit 53. The air which has once been filtered in filtration chamber 50 enters conduit 60 and is passed back around to the upstream side of filtration chamber 51 where it enters through open door 56. The air which has already been filtered once in filtration chamber is filtered a second time in filtration chamber 51. The layer of particulate matter on the upstream side of filter medium 52 and filtration chamber 51 defines a filter medium of enhanced filtration capacity. Once the air has been filtered a second time, it exits the downstream side of filtration chamber 51 through open door 57 into conduit 53 and out fluid outlet 61.

Figure 13:
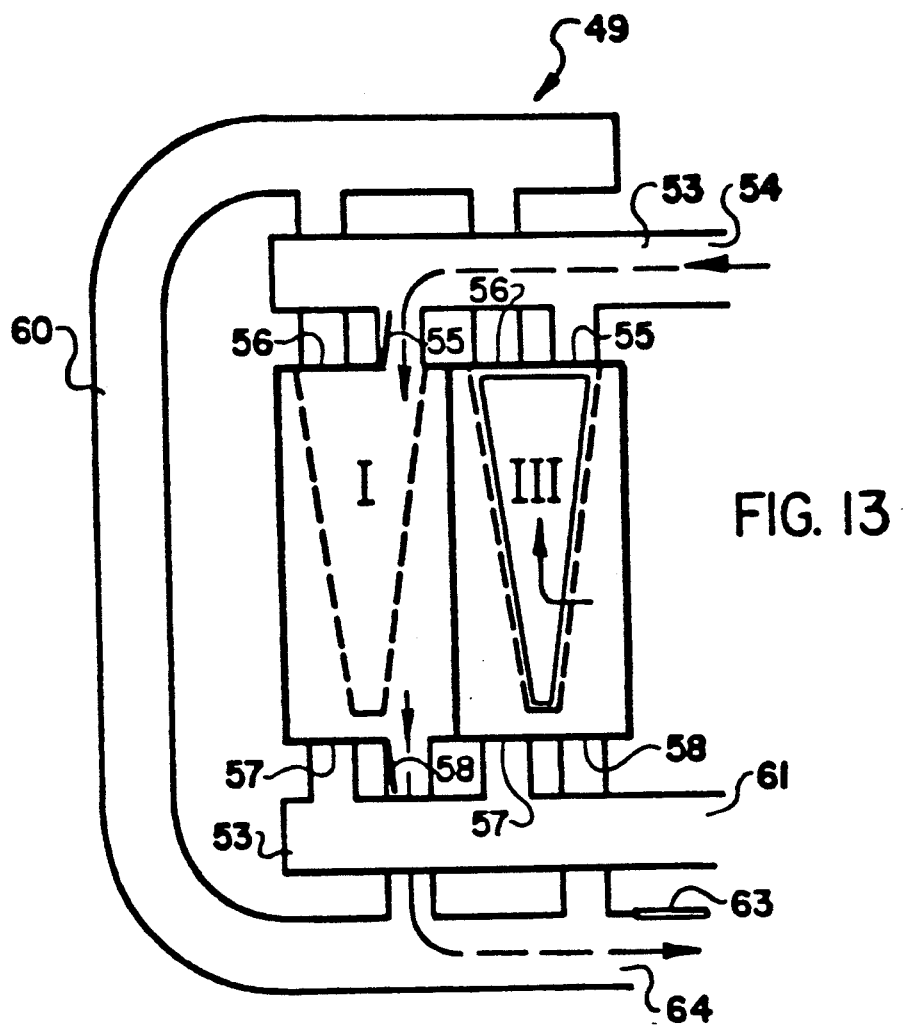
Figure 14:
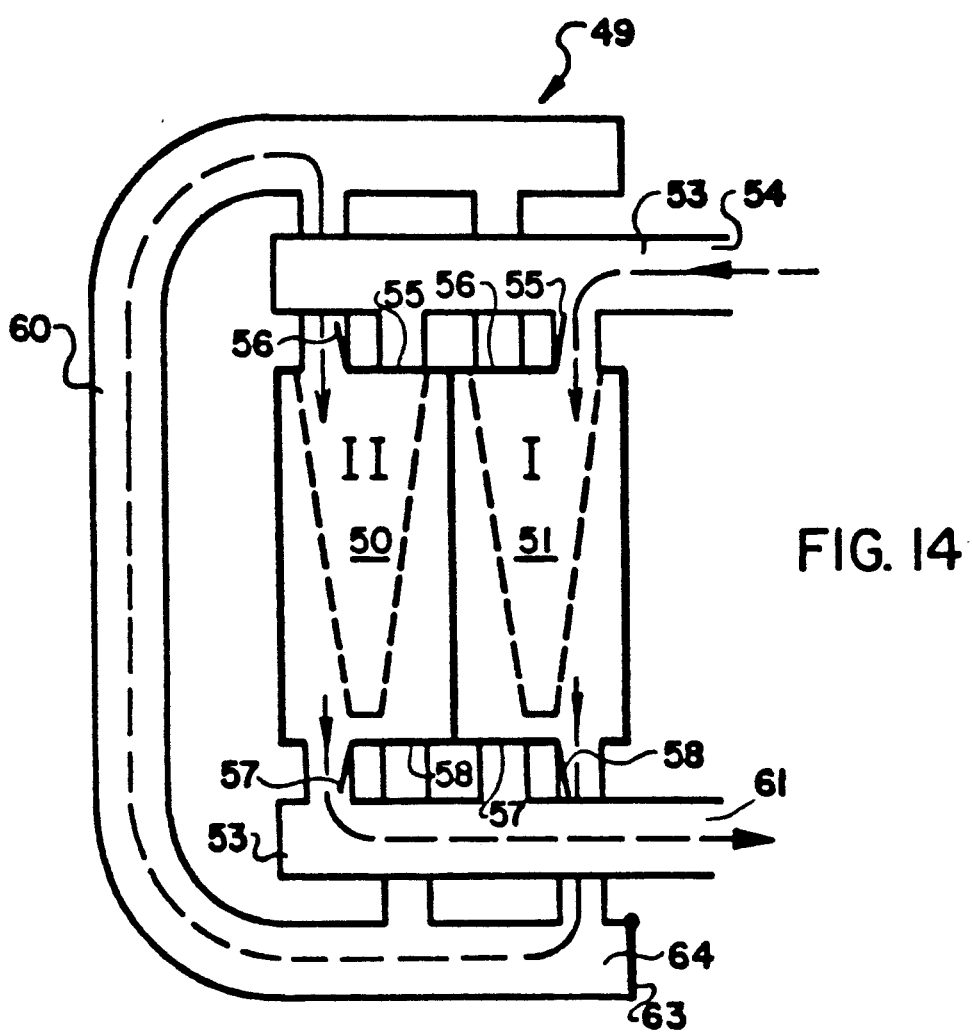

Referring now to FIG. 13, at the point during the filtration process when the layer of particulate matter on the filtration medium 52 in filtration chamber 51 (filter stage II) reaches a thickness and/or density where filtration efficiency and air passage is reduced, filtration chamber 51 is redefined as a cleaning stage by closing all of the doors 55-58 and opening the lower cleaning door (not shown, but see FIG. 4). A mechanical shaker physically removes the layer of particulate matter from the filtration medium 52, leaving a bare wire mesh filter surface. Note that filtration chamber 50 is still defined as the first filter stage as is indicated by open doors 55 and 58.

When the layer of particulate matter in filtration chamber 50 reaches an optimum level, doors 55 and 58 in filtration chamber 51 are opened, whereupon filtration chamber 51 begins to serve as a first stage filter. Simultaneously, doors 55 and 58 in filtration chamber 50 are closed and doors 56 and 57 are opened. Therefore, filtration chamber 50 begins operating as a second filter stage. In the configuration shown in FIG. 14, air enters through inlet 54 into conduit 53 and passes directly into filtration chamber 51 through open door 55. After leaving a deposit of particulate matter on the upstream side of filtration medium 52, the air exits the downstream end of filtration chamber 51 through open door 58 into conduit 60. The air is carried back around to the upstream side of filtration chamber 50 and enters filtration chamber 50 through open door 56. The twice filtered air exits through open door 57 into conduit 53 and out through fluid outlet 63.

Figure 15:
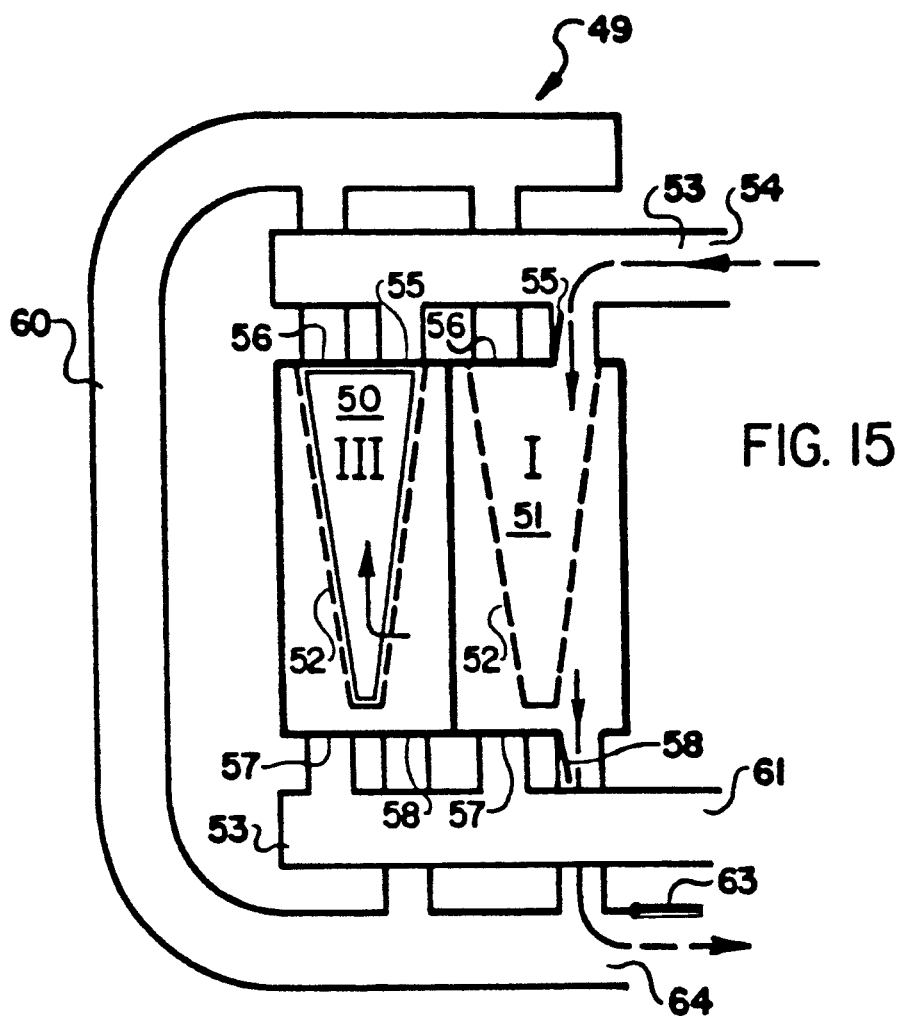

In FIG. 15, the layer of particulate matter in filtration chamber 50 has accumulated to the point where it must be cleaned. Therefore, it is defined as a cleaning stage and is cleaned in the manner described above while the layer of particulate matter in filtration chamber 51 continues to provide a filtration process to air entering through fluid inlet 54 and exiting through fluid outlet 61. Note that in FIGS. 13 and 15 the air is subjected to only a single filtration process before exiting through fluid outlet 61. Herein lies the primary distinction between the embodiment shown in FIGS. 5-11 and that shown in FIGS. 12-15. Therefore, the filter shown in FIGS. 12-15 is particularly suitable for situations where filtration standards are not as high but nevertheless where constant filtration at relatively high efficiency is desired.

An embodiment particularly suited for less critical environments is shown in FIGS. 16-18. In FIG. 16, a device 70 delivering air to be filtered is provided with a frame 71 set across a narrowed, rectangular outlet 72. Positioned in the frame 71 are first and second filter elements 73, 74 which comprise rectangular structures designed to fit in sealing relation into frame 71 and which include a filtration medium 73a, 74a. Filter elements 73, 74 sit one on top of the other and form primary and secondary filters. Particulate laden air from the upstream source is first filtered through filter element 73 until a layer of particulate matter is accumulated of sufficient thickness to serve as an efficient filter. Then, filter element 74, positioned below filter element 73, is removed and filter element 73 drops downwardly in frame 71. Filter element 74 is placed on top of filter element 73 in the place just vacated by filter element 73. Filter element 74 then acts as a first stage filter as particulate matter accumulates, while filter element 73 acts as a final, more efficient second stage filter. Filtered air exits downstream from frame 71 through an outlet 75A A pressure differential sensor 76 detects the point in time when the pressure drop across the filter elements 73, 74 indicate that the filter elements 73, 74 must be reversed again. The lower filter is removed and cleaned. The upper filter drops downwardly to function as the second stage filter and the newly cleaned filter is placed over the lower filter to begin accumulating particulate matter once again. This process repeats over and over. The filter construction is quite simple, as is shown in FIGS. 17 and 18. An alarm (not shown), such as a bell or light can alert the attendant the filter must be changed.

Referring now to FIGS. 19-22, these show a filter with first and second filter chambers 100 and 102. The filter is operated in similar manner to the filter of FIGS. 12-15, the essential difference being the manner of control of the flow, through the filter, of the stream to be filtered. Whereas in the embodiment of FIGS. 12-15 the stream is controlled by means of four doors into each chamber 50, 51, in the embodiment of FIGS. 19-22, the stream is controlled by two butterfly valves 104, 106, set at respective nodes 108, 110 between conduits.

Referring to FIGS. 19-22 in greater detail, the stream, typically air, to be filtered enters a first conduit 112 through an inlet 114, flow being caused either by upstream pressurization or downstream suction. The conduit leads to the node 108, a four-branch node toward the inlet side of the filter. A second conduit 116 from the node 108 communicates with the upstream side of the chamber 100, and a third conduit 118 from the node 108 communicates with the upstream side of the chamber 102. A fourth conduit 120 from the node 108 communicates with the second node 110, a four-branch node toward the outlet side of the filter. A fifth conduit 121 leads from the second node 110 to an outlet 128. A sixth conduit 122, leading to the node 110, communicates with the downstream side of the chamber 100, and a seventh conduit 124 leads from the node 110 to the downstream side of the chamber 102. The conduits 112, 116, 118 and 120 of node 108 are orthogonally arranged, as are the conduits 120, 121, 122 and 124 of node 110.

Each butterfly valve 104, 106 has two operative positions, across the two diagonals of the respective node 108, 110. The two operative positions for butterfly valve 104 can be seen in FIGS. 19 and 21. The two working positions for butterfly valve 106 can be seen in FIGS. 19 and 20. Moreover each valve is movable independently of the other in this embodiment, so that there are four possible combinations of valve positions. These four combinations are shown in FIGS. 19-22.

Figure 19:
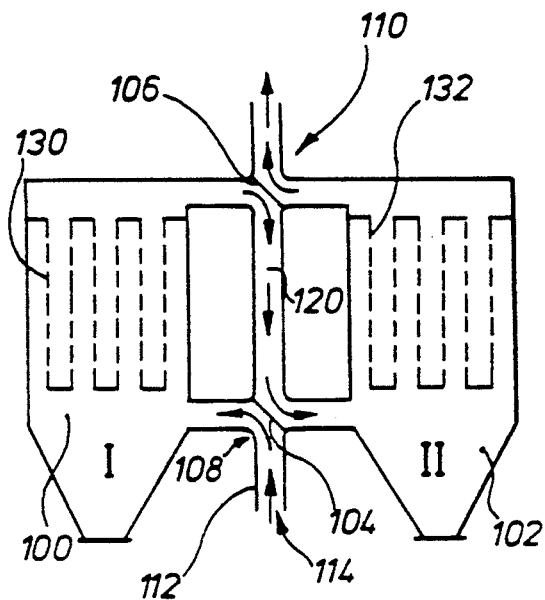
FIGS. 19-22 illustrate another embodiment of a filter, employing butterfly valves at nodes between conduits, in sequential stages of operation.
Figure 20:
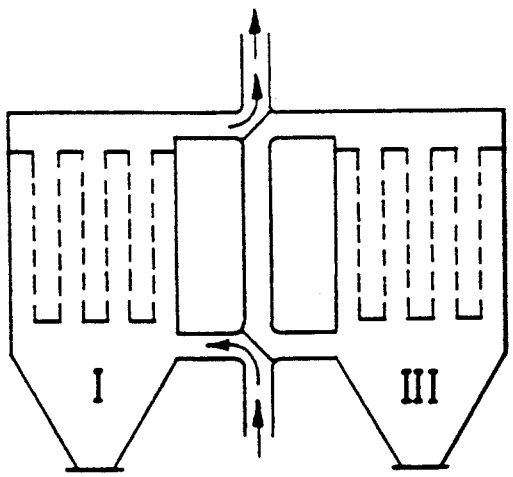

Referring now to FIG. 19, the butterfly valve 104 on the inlet side of the filter is arranged so that air to be filtered flows from first conduit 112, leading from inlet 114, into conduit 116, leading to the upstream side of chamber 100. Chamber 100 is thus defined as a first filter stage, represented by Roman Numeral I, as previously. Air which has passed through filter mesh 130 of the chamber 100, and through the layer of particulate matter building up on the filter mesh 130, leaves chamber 100 along conduit 122, to the second node 110. The butterfly valve 106 of node 110 is arranged so that air flows along conduit 120 back to first node 108, where butterfly valve 104 diverts it to conduit 118, leading to chamber 102, which is thus defined as a second filter stage, represented by Roman Numeral II, as previously. Filtered air leaves the chamber 102 along conduit 124, and at node 110 is diverted by butterfly valve 106 into conduit 121, leading to filter outlet 128. Referring now to FIG. 20, at the point during the filtration process when the layer of particulate matter on the filtration medium 132 in the filtration chamber 102 (filter stage II) reaches a thickness and/or density where air passage is reduced by more than a given amount, filtration chamber 102 is redefined as a cleaning stage by switching over butterfly valve 106, whereby air, having been filtered in chamber 100, is diverted to conduit 121 leading to filter outlet 128, without undergoing a second filtration stage. In many environments this is arranged to occur when the pressure drop across the filter is about 4" water gauge. The chamber 102 may be cleaned by opening a lower cleaning door (not shown, but see FIG. 4), above a removable container (not shown, but see containers 156 and 158 in FIG. 23). The layer of particulate matter is removed from the filtration medium 132 by means of a mechanical shaker, or mechanical rapping, or by a compressed air pulse, leaving the bare stainless steel wire mesh filter surface.

Figure 21:
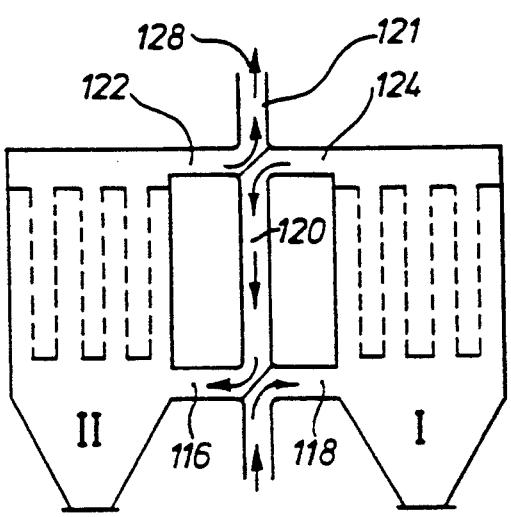

Referring now to FIG. 21, the chamber 102 has been brought back into operation and two-stage filtration is once again taking place. In many environments the pressure drop across the filter is now about 2" water gauge. Relative to FIG. 20, the butterfly valve 104 has been switched over, so that the chamber 102 is defined as the first stage filter, in which the matt is built. By virtue of the position of the butterfly valve 106 the chamber 100 is now defined as the second stage filter.

Figure 22:
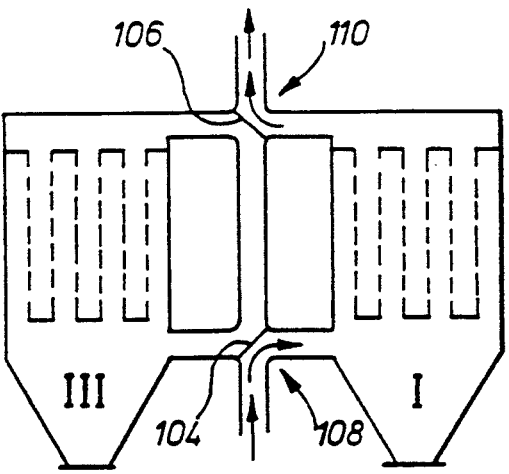

Referring now to FIG. 22, this shows the chamber 100 in its cleaning stage, the butterfly valve 106 having been switched over to divert air filtered in chamber 102 into conduit 121 leading to outlet 128.

It will be observed that air flow in the embodiment of FIGS. 19-22 is controlled by two moving parts, the butterfly valves, compared with eight, the doors to chambers, in the embodiment of FIGS. 12-15. The position of the butterfly valves may be controlled in standard manner, for example by means of electric solenoids or pneumatic cylinders, or by simple manual means. The position of valves may be altered, automatically or manually, in response to sensed pressure conditions, or following lapse of a given period of time, or at the start of a new shift.

The embodiment of FIGS. 19-22 permits continuous filtration. For most of the time two-stage filtration occurs, and only for short periods of time, when one chamber is being cleaned, does one-stage filtration occur. However there are circumstances in which continuous filtration is not needed, for example because of regular machine shut-down, and in which cleaning does not need to be effected during operation. In such circumstances, the butterfly valves are only required to adopt two combinations of positions, those shown in FIGS. 19 and 21, that is, the positions in which they are parallel to each other. To this end, the valves may be electrically or mechanically interlinked, so that only those positions are possible.

Some particulate materials, for example hygroscopic materials, may require removal by means of water, steam or an organic solvent. It may be desirable to ensure that the cleaned chamber is dry before bringing it back into operation, by waiting a sufficient time for a cleaning liquid to evaporate, under natural evaporation or assisted evaporation. Assisted evaporation may involve an air flow and/or the application of heat, for example by providing warm air. For example, after a cleaning phase (FIG. 22), the system could be switched to its previous phase (FIG. 21), for drying the cleaned chamber with the air which has been filtered by the other chamber, and then switched over to two-stage filtration (FIG. 19). Alternatively or additionally, evaporation can be assisted by passing a warm gas through a chamber to be dried via an input conduit and an output conduit additional to those already described, and shown in FIGS. 19-22.

Conveniently, a gas can be warmed, in order to assist evaporation, by external heating of a conduit upstream of the chamber to be dried.

Figure 23:
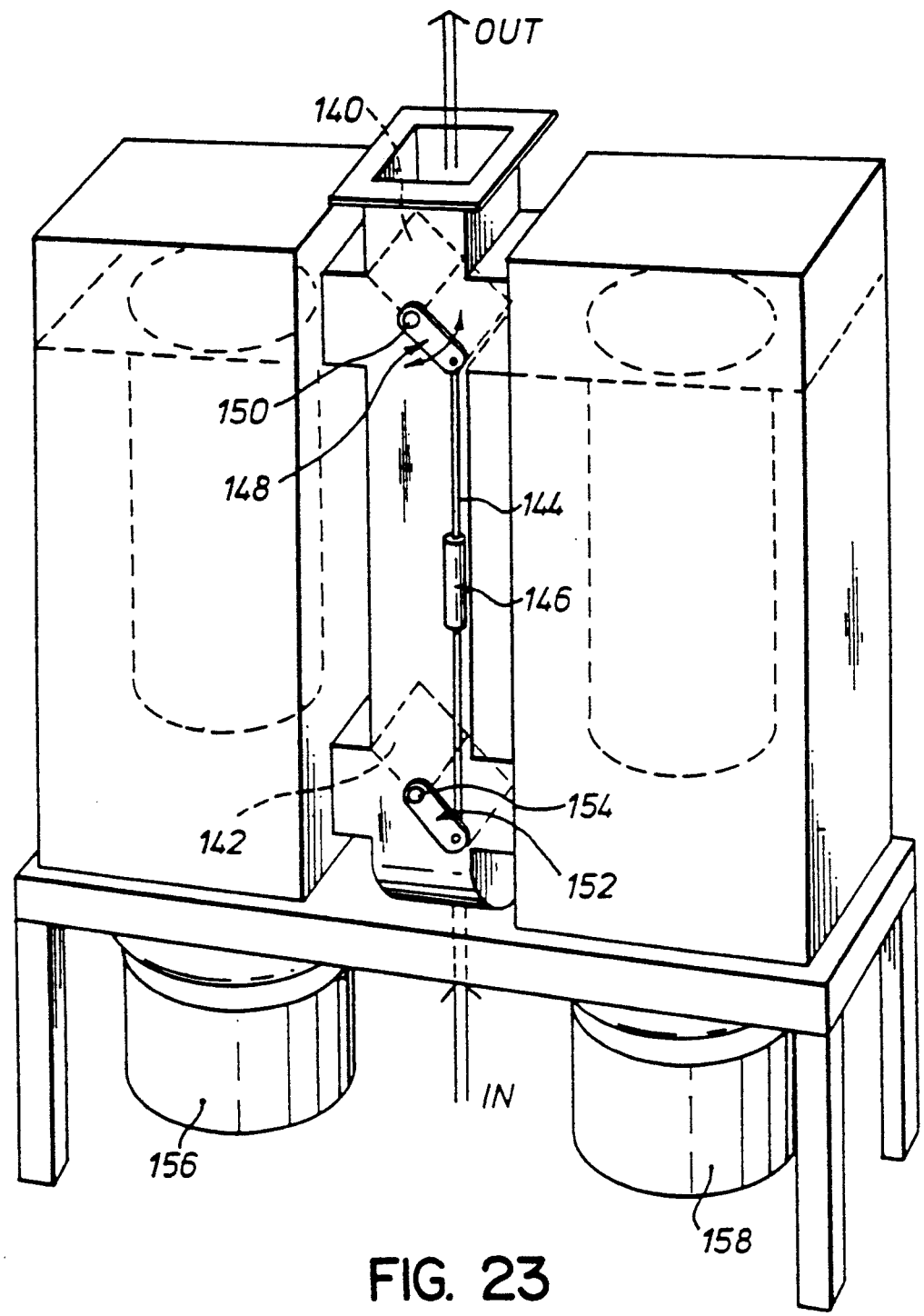
FIG. 23 shows a filter having mechanically interlinked butterfly valves.

FIG. 23 shows a filter similar to that shown in FIGS. 19-22, but in which the butterfly valves shown in hidden detail as 140 and 142 can only adopt the parallel configurations shown in FIGS. 19 and 21. To this end they are mechanically interlinked by a push rod 144 which has a central gripping handle 146. At its top end the push rod is pivoted to one end of a lever 148, the other end of which is secured to the butterfly valve 140 about its medial pivot axis 150, for common movement therewith. At its lower end the push rod is pivoted to one end of a lever 152, the other end of which is secured to the butterfly valve 142 about its medial pivot axis 154, for common movement therewith.

With the embodiment of FIG. 23, at the end of a working shift and if a pressure gauge (not shown) shows it to be necessary, the chamber which was acting as the second filter stage (II) is cleaned, following removal of a lower collection container 156 or 158. These are connected to the lower regions of the respective chambers by means of quick release clamps, and can be removed for cleaning whenever necessary. After cleaning, the push rod is pushed to its other working position, so that the cleaned chamber next acts as the first stage filter, and the other chamber acts as the second stage filter.

Figure 25:
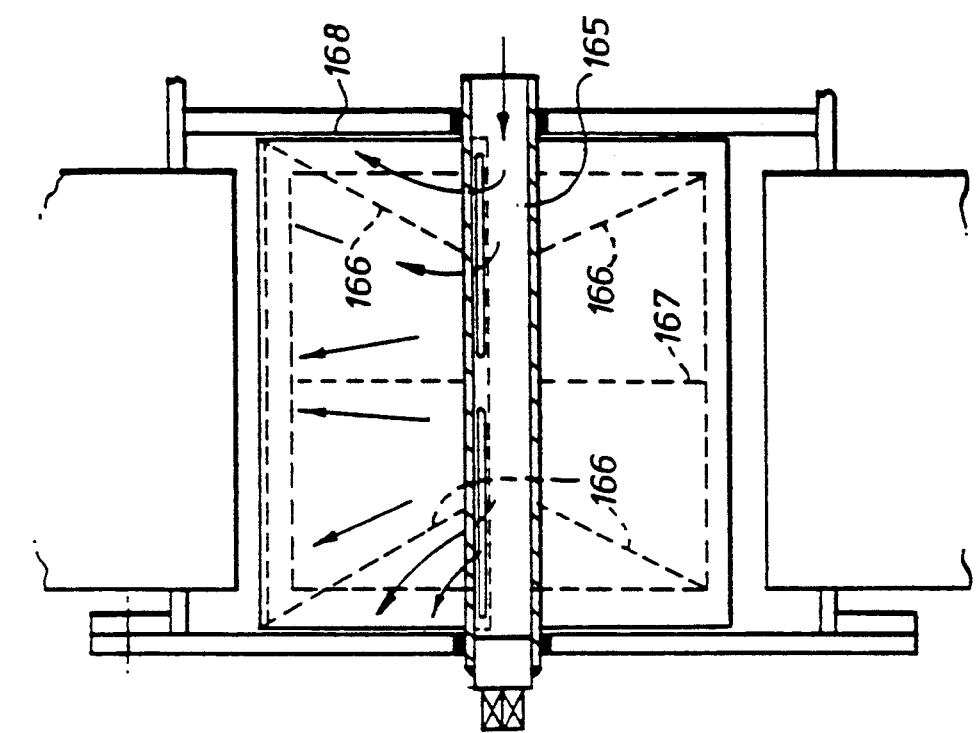
FIG. 25 shows the butterfly valve of FIG. 23, in position at a node between conduits.
Figure 24:
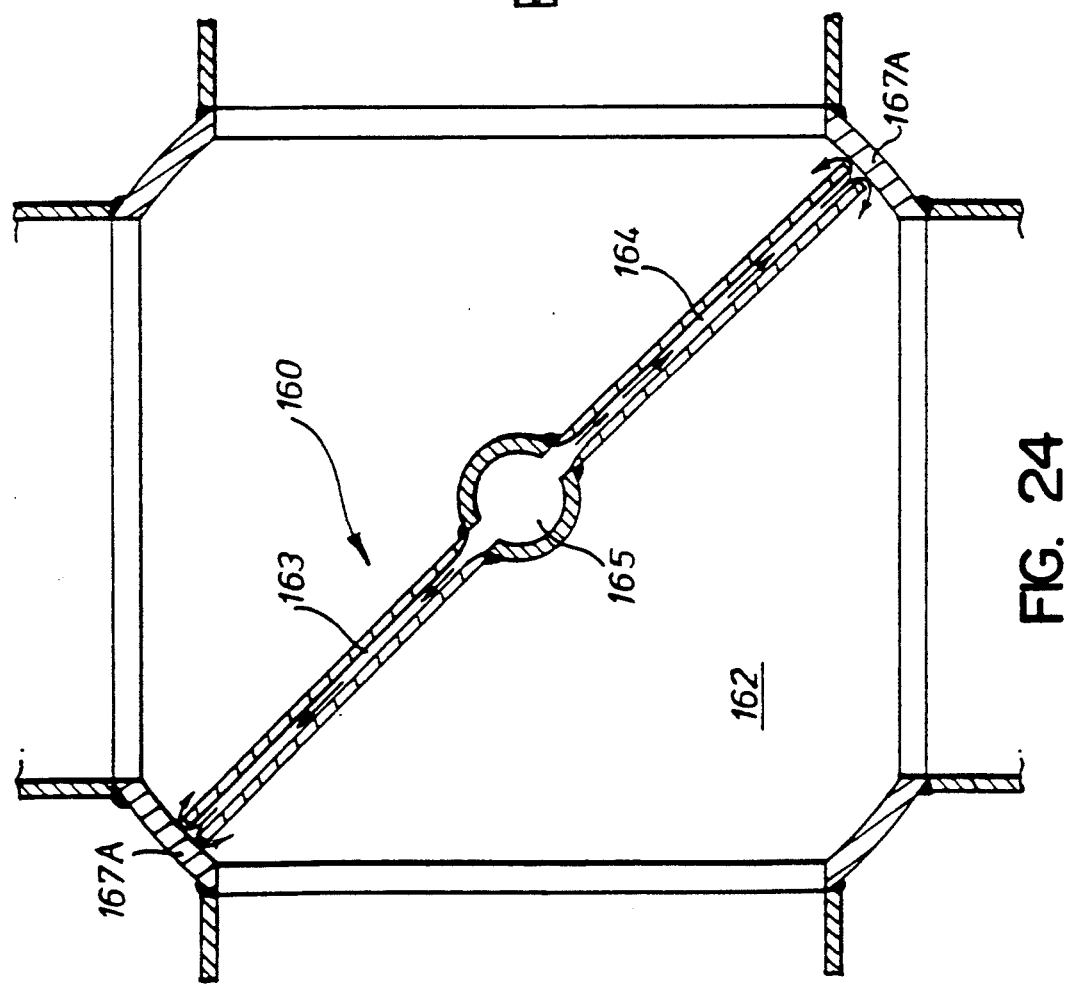
FIG. 24 shows a butterfly valve which may be used in the embodiment of FIGS. 19-22, in cross-section.

FIGS. 24 and 25 show a butterfly valve which may be used in the embodiments of FIGS. 19-23, but which may also find application in other, unrelated, fields. With reference to FIG. 24, the butterfly valve is located at a node 110 between the four conduits, arranged orthogonally. The valve plate 160 contains air passages 163, 164, fed by a common feed conduit 165 which is coaxial with the medial pivot axis of the valve. The narrow air passages extend to all edges of the valve plate 160, evenness of flow and of rate of emission of air, to all sides of the valve plate being assisted by means of distribution baffles 166, 167 indicated in dotted line in FIG. 25.

It will be observed in FIGS. 24 and 25 that the edges of the valve plate 160 are located adjacent to, but do not touch, the internal walls, namely quadrant walls 167 and side walls 168, of the node. There is a gap therebetween of 1/16" (1.6 mm). However despite not touching these walls, a good seal is obtained by means of air flow through the narrow air passages fed by the feed conduit 165. The air leaves the narrow air passages at the edges of the valve plate, closely adjacent to the internal walls of the node, and is forced to both sides of the plane of the valve plate, by the adjacent walls 167, 168 of the node, as indicated by the arrows in FIG. 24. The air flow is sufficient to prevent passage past the valve of the air whose flow is being controlled by the valve.

Figure 26:
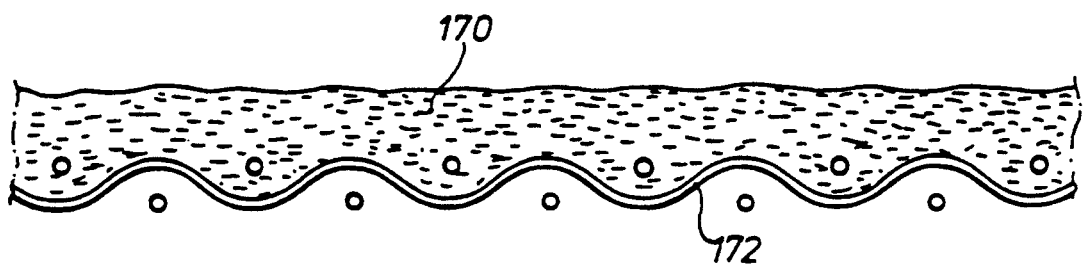
FIG. 26 shows, schematically, a layer of particulate matter which acts as a filter medium, containing an even distribution of a chemical decontaminant material.
Figure 27:
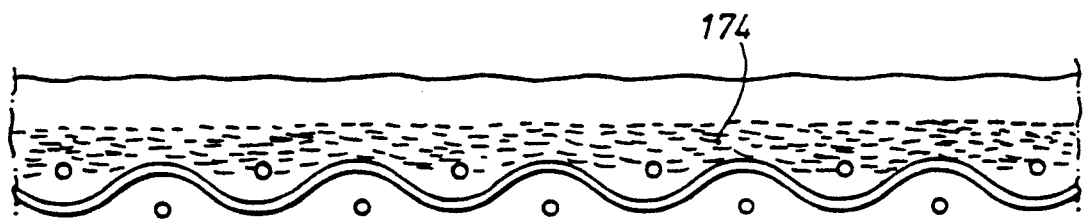
FIG. 27 shows, schematically, layer of particulate matter which acts as a filter medium, containing a layer of particulate matter with a discrete stratum rich in a chemical decontaminant material.

FIGS. 26 and 27 relate to the entrainment, within the matt or cake 170 of particulate matter built up on a rigid stainless steel filter mesh 172, of a particulate chemical reactant/decontaminant material able to react with an undesirable gas carried by a fluid stream being filtered. In this embodiment the reactant material is sodium bicarbonate, and the undesirable gas is sulfur dioxide ($SO_2$), carried by a flue gas stream. The fluid which passes through the filter medium is substantially free from sulfur dioxide, because of the presence of sodium bicarbonate.

In the embodiment of FIG. 26 the sodium bicarbonate, in particulate form, ground to substantially correspond in fineness to the particulate matter to be filtered, is steadily fed into the stream to be filtered so that the matt contains an even distribution of sodium bicarbonate. In the embodiment of FIG. 27 it is fed into the stream to be filtered over a relatively short period shortly after the matt has started to build up, to form a discrete stratum which is rich in sodium bicarbonate.

It will be appreciated that the use of a reactant material in the formation of a matt which is to act as a filter medium can be used with any of the embodiments described or defined herein, in which there are at least two filtration chambers arranged in series with means for selectively redefining the filter stages thereof; and also in any other apparatus in which the matt itself is intended to act as a filter medium.

It should be noted that various aspects and embodiments referred to herein, in the Claims and elsewhere, may be independent of each other, but may also be used advantageously in combination, if desired. Further aspects of the invention are constituted by combinations of aspects or embodiments described or defined herein.

A multi-stage fluid filter and method is described above. Various details of the invention may be changed without departing from its scope. Furthermore, the foregoing description of the preferred embodiments of a multi-stage fluid filter and method according to the present invention is provided for the purpose of illustration only and not for the purpose of limitation—the invention being defined by the claims.

I claim:

1. A multi-stage fluid filter for filtering entrained particulate matter from a moving fluid stream, in which filter particulate matter may undergo primary and secondary filtration stages, the secondary filtration stage being through a filter medium which comprises a layer of accumulated particulate matter, the first filtration stage being through a filter medium on which a layer of particulate matter is accumulating, for use subsequently in a said second filtration stage, the filter comprising:

first and second filtration chambers, each filtration chamber having a filtration medium positioned therein from an upstream side to a downstream side thereof;
an inlet into the fluid filter;
an outlet from the fluid filter;
first conduit means leading from said inlet;
second conduit means leading from the first conduit means to the first chamber on the upstream side relative to the filter medium thereof;
third conduit means leading from the first conduit means to the second chamber on the upstream side relative to the filter medium thereof;
a node at which the first, second and third conduit means meet; valve means associated with the node and having a first control position in which it permits fluid to flow from the first conduit means to the second conduit means, and a second control position in which it permits fluid to flow from the first conduit means to the third conduit means;
and means for directing fluid which has flowed through the first or second chamber in a primary filtration stage, to the second or first chamber for a secondary filtration stage, and then to the outlet.

2. A filter according to claim 1, wherein the conduit means for directing fluid which has flowed through the first or second chamber in a primary filtration stage, to the second or first chamber for a secondary filtration stage, and then to the outlet, comprises a fourth conduit means which meets the first, second and third conduit means at the node, and through which fluid may be conveyed toward the chamber providing the secondary filtration stage, wherein said first control position of the valve means permits fluid to flow from the first conduit means to the second conduit means and, simultaneously, from the fourth conduit means to the third conduit means, and wherein said second control position of the valve means permits fluid to flow from the first conduit mean to the third conduit means and, simultaneously, from the fourth conduit means to the second conduit means.

3. A filter according to claim 1, wherein said valve means is a butterfly valve, having a valve plate movable about a medial axis.

4. A multi-stage fluid filter for filtering entrained particulate matter from a moving fluid stream, in which filter particulate matter may undergo primary and secondary filtration stages, the secondary filtration stage being through a filter medium which comprises a layer of accumulated particulate matter, the first filtration stage being through a filter medium on which a layer of particulate matter is accumulating, for use subsequently in a said second filtration stage, the filter comprising:

first and second filtration chambers, each filtration chamber having a filtration medium positioned therein from an upstream side to a downstream side thereof;
an inlet into the fluid filter;
an outlet from the fluid filter;
conduit means "one" leading to said outlet;
conduit means "two" leading from the first chamber on the downstream side relative to the filter medium thereof, to the conduit means "one";
conduit means "three" leading from the second chamber on the downstream side relative to the filter medium thereof, to conduit means "one";
a node at which conduit means "one", "two" and "three" meet; valve means associated with that node and having a first control position which permits fluid to flow from conduit means "three" to conduit means "one", and a second control position in which it permits fluid to flow from conduit means "two" to conduit means "one"; and conduit means for directing fluid which has entered the filter through the inlet selectably through the first or second chamber in a primary filtration stage, then to the second or first chamber in a secondary filtration stage, then to said node at which conduits "one", "two" and "three" meet.

5. A filter according to claim 4, wherein the conduit means for directing fluid which has entered the filter through the inlet selectably through the first or second chamber in a primary filtration stage, then to the second or first chamber in a secondary filtration stage, then to said node at which conduits "one", "two" and "three" meet, comprises conduit means "four" which meets conduit means "one", "two" and "three" at the node, and through which fluid may be conveyed from the chamber providing the primary filtration stage, wherein said first control position of the valve means permits fluid to flow from conduit means "two" to conduit means "four" and, simultaneously, from conduit means "three" to conduit means "one", and wherein said second control position of the valve means permits fluid to flow from conduit means "two" to conduit means "one" and, simultaneously from conduit means "three" to conduit means "four".

6. A filter according to claim 5, wherein said fourth conduit means corresponds to said conduit means "four" and extends between the nodes.

7. A filter according to claim 4, wherein the valve means is a butterfly valve having a valve plate movable about a medial axis.

8. A multi-stage fluid filter for filtering entrained particulate matter from a moving fluid stream, the filter comprising:

first and second filtration chambers, each filtration chamber having a filtration medium positioned therein from an upstream side to a downstream side thererof;
an inlet into the multi-stage fluid filter;
an outlet from the multi-stage fluid filter;
first conduit means leading from said inlet;
second conduit means leading from the first conduit means to the first chamber on the upstream side relative to the filtration medium thereof;
third conduit means leading from the first conduit means to the second chamber on the upstream side relative to the filtration medium thereof;
fourth conduit means;
a first node at which the first, second, third and fourth conduit means meet;

first valve means associated with the first node and having a first control position in which it permits fluid to flow from the first conduit means to the second conduit means, and, simultaneously, from the fourth conduit means to the third conduit means, and a second control position on which it permits fluid to flow from the first conduit means to the third conduit means, and, simultaneously, from the fourth conduit means to the second conduit means;

fifth conduit means leading to said outlet;

sixth conduit means leading from the first chamber on the downstream side relative to the filtration medium thereof, to the fifth conduit means;

seventh conduit means leading from the second chamber on the downstream side relative to the filtration medium thereof, to the fifth conduit means;

a second node at which the fourth, fifth, sixth and seventh conduit means meet;

and second valve means associated with the second node and having a first control position which permits fluid to flow from the sixth conduit means to the fourth conduit means, and, simultaneously, from the seventh conduit means to the fifth conduit means, and a second control position in which it permits fluid to flow from the sixth conduit means to the fifth conduit means, and, simultaneously, from the seventh conduit means to the fourth conduit means.

9. A filter according to claim 8, wherein the first and second valve means are butterfly valves, each having a valve plate movable about a medial axis.

10. A filter according to claim 9, wherein each butterfly valve has:

a valve plate movable bout a medial axis, and having edges past which a fluid whose flow is being controlled by the valve plate is substantially unable to pass, in use, when the valve plate is in an operative position;

means defined within the valve plate for the passage of a gas; and gas outlet means associated with said edges, said gas outlet means communicating with said means defined within the valve plate for the passage of a gas.

11. A filter according to claim 8, wherein each of said valve means is able to adopt its first or second control position irrespective of the position of the other valve means, whereby there are four possible combinations of control positions of the first and second valve means.

12. A filter according to claim 8, comprising mechanical or electro-mechanical means interlinking said first and second valve means, so arranged that they must both be in their first control positions, or both be in their second control positions.

13. A filter according to claim 8, wherein the filter is of the type wherein two-stage filtrations (as herein defined) is the normal operative condition, and cleaning is carried out either by filter shut-down or by taking one chamber out of filtration operation, whereby one-stage filtration takes place whilst that chamber is being cleaned.

14. A valve having a valve member and a seating therefor, the valve having passage means for the emission of a gas in the region in which the valve member and the seating are juxtaposed, and a seal substantially maintained therebetween solely by the emission of said gas.

15. A valve according to claim 14, wherein the passage means is provided in said valve member.

16. A valve according to claim 15, wherein the axis of the valve plate, about which axis the valve plate may turn, is provided with conduit means which communicates with said means defined within the valve plate for the passage of a gas.

* * * * *